US011190687B2

(12) United States Patent
Shibata

(10) Patent No.: US 11,190,687 B2
(45) Date of Patent: Nov. 30, 2021

(54) IMAGE BLUR CORRECTION CONTROL APPARATUS, CAMERA BODY, LENS UNIT, IMAGE BLUR CORRECTION CONTROL METHOD, AND STORAGE MEDIUM

(71) Applicant: CANON KABUSHIKI KAISHA, Tokyo (JP)

(72) Inventor: Nobuhiro Shibata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/909,492

(22) Filed: Jun. 23, 2020

(65) Prior Publication Data

US 2020/0412955 A1 Dec. 31, 2020

(30) Foreign Application Priority Data

Jun. 25, 2019 (JP) .............................. JP2019-117711

(51) Int. Cl.
*H04N 5/232* (2006.01)

(52) U.S. Cl.
CPC ..... *H04N 5/23258* (2013.01); *H04N 5/23254* (2013.01); *H04N 5/23267* (2013.01); *H04N 5/23277* (2013.01)

(58) Field of Classification Search
None
See application file for complete search history.

(56) References Cited

U.S. PATENT DOCUMENTS

| 5,231,445 A * | 7/1993 | Onuki ................ H04N 5/23248 396/55 |
| 2006/0083502 A1* | 4/2006 | Higo .................. H04N 5/23261 396/55 |
| 2006/0132612 A1* | 6/2006 | Kawahara .......... H04N 5/23261 348/208.6 |
| 2019/0222762 A1* | 7/2019 | Watanabe ................ H04N 5/38 |
| 2020/0412955 A1* | 12/2020 | Shibata .............. H04N 5/23258 |

FOREIGN PATENT DOCUMENTS

JP 5460170 B2 4/2014

* cited by examiner

*Primary Examiner* — William B Perkey
(74) *Attorney, Agent, or Firm* — Cowan, Liebowitz & Latman, P.C.

(57) ABSTRACT

There is provided an image blur correction control apparatus for correcting image blur of an image capturing apparatus through sharing with a second image blur correction control apparatus in accordance with a predetermined sharing rule. In a case where a first characteristic of the first detector is better than a second characteristic of a second detector included in the second image blur correction unit, a first deciding unit decides a first cutoff frequency based on shake information detected by the first detector, a transmitting unit transmits the first cutoff frequency to the second image blur correction control apparatus as a cutoff frequency to be used by the second image blur correction control apparatus, and a filtering unit performs filter processing on the shake information detected by the first detector. The first cutoff frequency is applied in the filter processing.

12 Claims, 16 Drawing Sheets

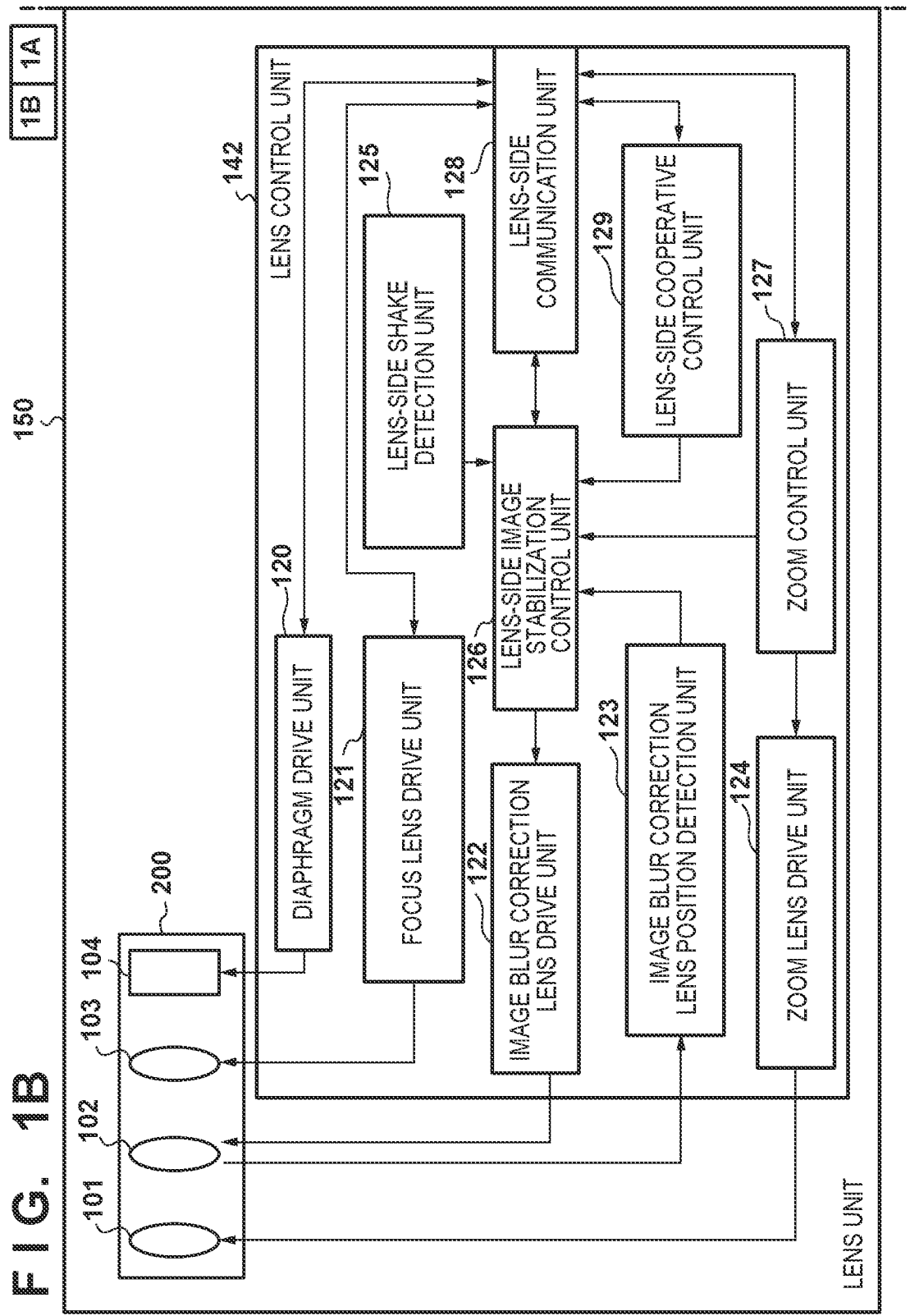

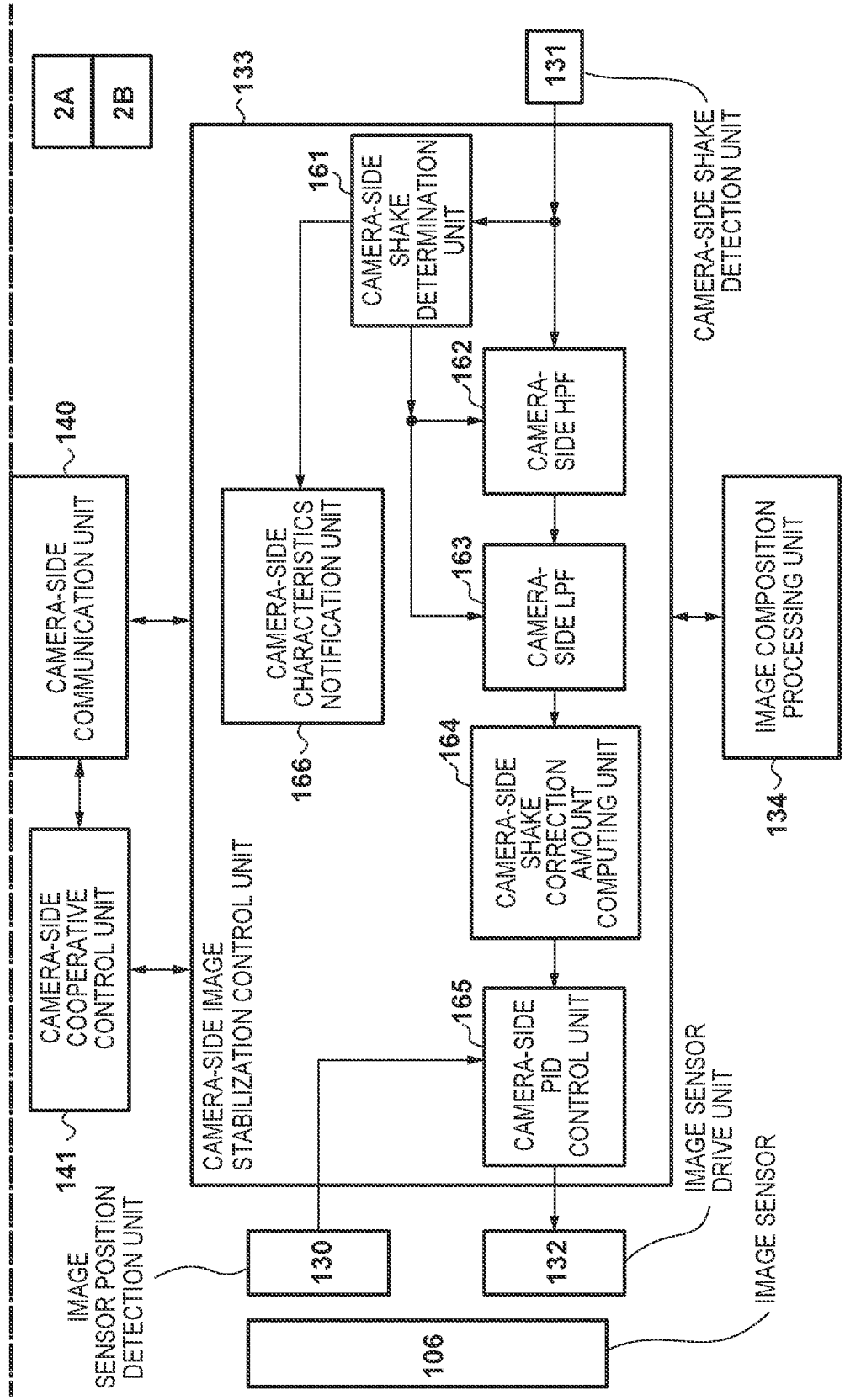

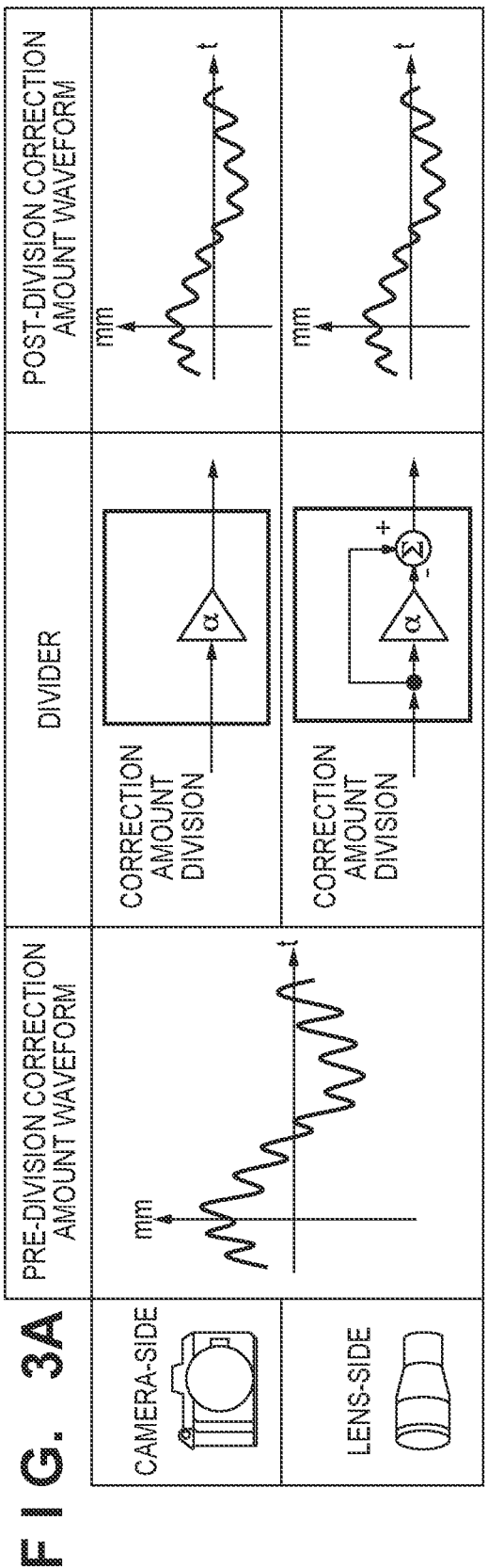
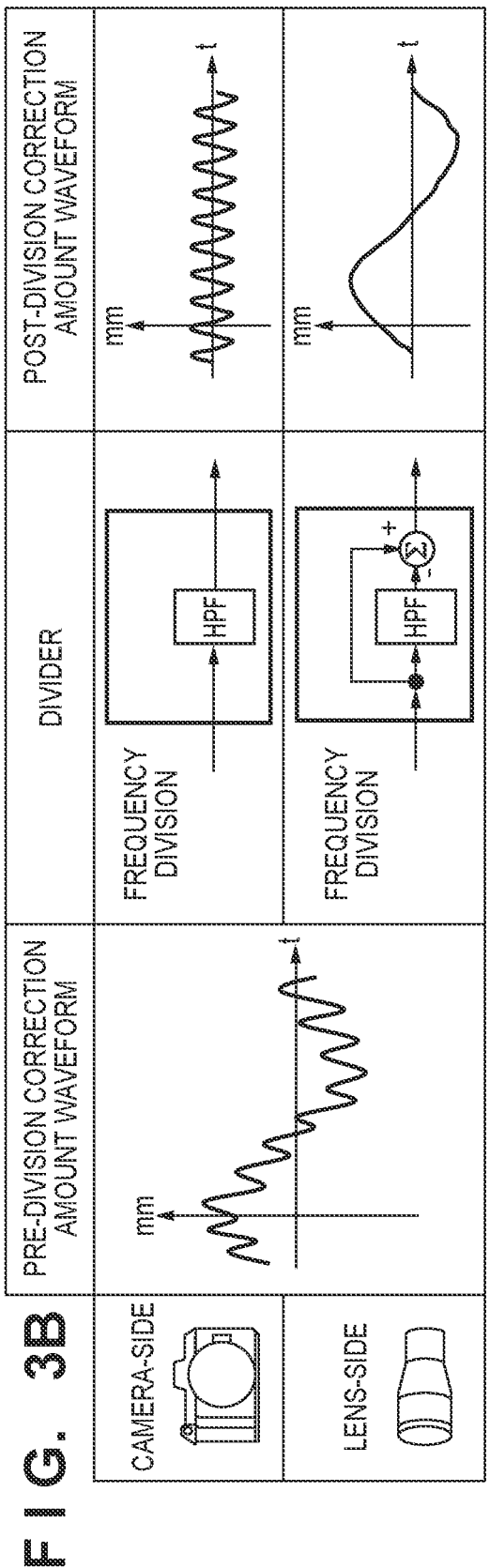

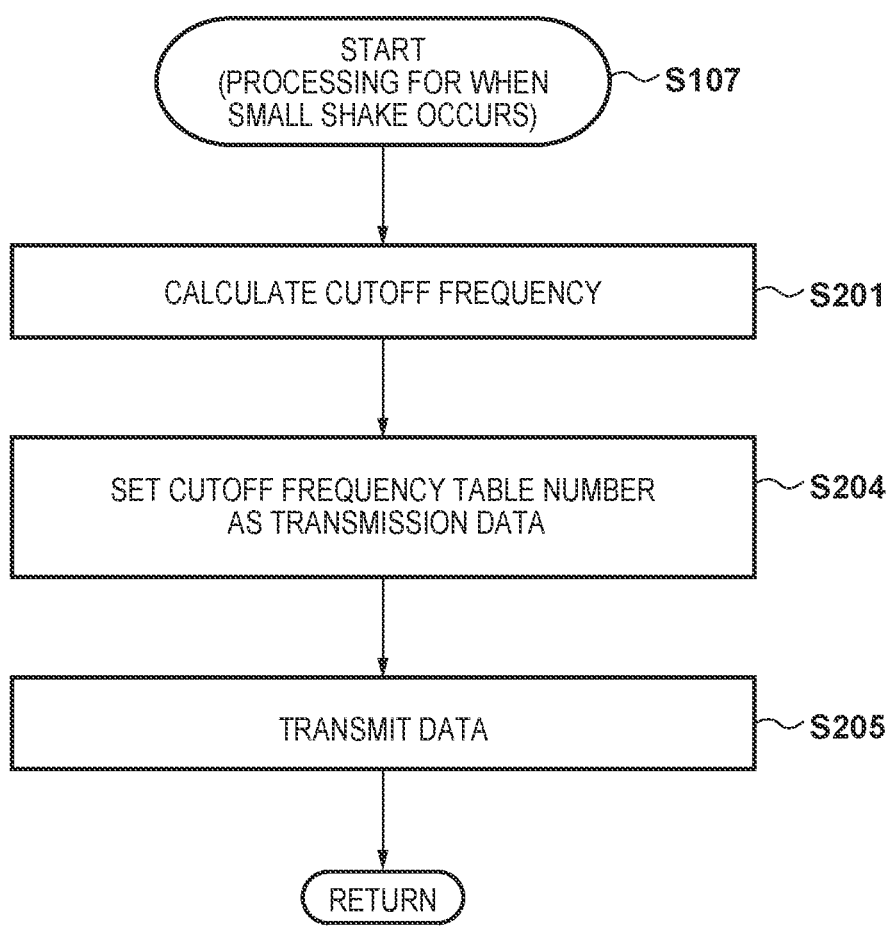

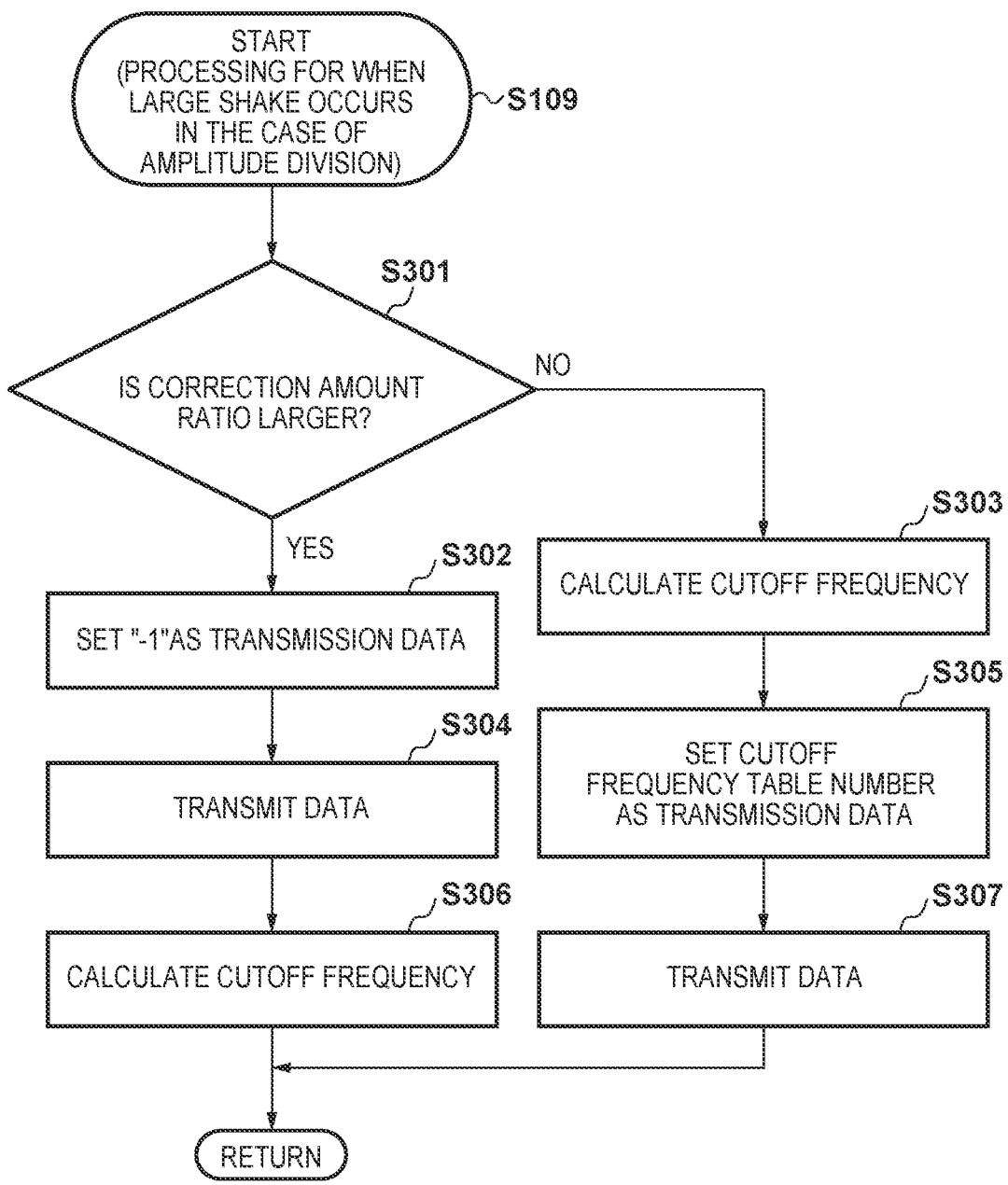

IMAGE BLUR CORRECTION CONTROL APPARATUS, CAMERA BODY, LENS UNIT, IMAGE BLUR CORRECTION CONTROL METHOD, AND STORAGE MEDIUM

BACKGROUND OF THE INVENTION

Field of the Invention

The present invention relates to an image blur correction control apparatus, a camera body, a lens unit, an image blur correction control method, and a storage medium.

Description of the Related Art

Recent image capturing apparatuses, such as digital still cameras and video cameras, are generally provided with an image blur correction function. There are commonly two types of image blur correction functions. One type realizes an image blur correction operation mainly by moving a correction lens exclusively for image blur correction (hereinafter, "image blur correction lens") in a direction perpendicular to the optical axis. The other type realizes an image blur correction operation by moving the image sensor in a direction perpendicular to the optical axis.

By driving these two image blur correction mechanisms at the same time, the correction range can be broadened as compared with the case of only one of the image blur correction mechanisms. A further image blur correction operation at slow shutter speeds thereby becomes possible, enabling image blur correction performance to be enhanced.

Normally, the image blur correction range has a mechanical limit (hereinafter, "correction limit"). In order to prevent the image blur correction mechanisms from hitting the correction limit, control (hereinafter, "panning control") for maintaining the image blur correction lens or the image sensor in a mechanical center position as much as possible is known. Specifically, a technique for appropriately setting the image blur correction characteristics, by changing the cutoff frequency of a filter that is used in the process of calculating the shake correction amount according to the frequency and amplitude of image blur has been proposed (Japanese Patent No. 5460170).

There are a number of methods of driving the image blur correction lens and the image sensor at the same time, semi-independent control being one such method. Semi-independent control is a method that uses the output value of a shake detection unit on the camera side to perform image blur correction control of the image sensor, and uses the output value of a shake detection unit on the lens side to perform image blur correction control of the image blur correction lens. At this time, in order to improve the appearance of the live view image, processing for aligning the characteristics of panning control of the image blur correction lens and the image sensor may be performed.

However, the characteristics (performance) of the shake detection unit on the camera side may differ from the shake detection unit on the lens side. In the case of a low performance shake detection unit, a slow panning operation may be indistinguishable from noise detected by the shake detection unit, depending on the state of the shake (e.g., low frequency and low amplitude). Accordingly, when the user performs a slow panning operation, the slow panning operation may be appropriately detected in one shake detection unit and not detected in the other shake detection unit. In such cases, it is difficult to align the characteristics of panning control on the camera side and the lens side.

SUMMARY OF THE INVENTION

The present invention has been made in view of such situations. The present invention provides a technology for deciding the cutoff frequency of filter processing that is performed on shake by an image blur correction control apparatus that controls image blur correction in cooperation with another image blur correction control apparatus, with consideration for differences in the characteristics of shake detection units of the image blur correction control apparatuses.

According to a first aspect of the present invention, there is provided an image blur correction control apparatus for correcting image blur of an image capturing apparatus through sharing with a second image blur correction control apparatus in accordance with a predetermined sharing rule, comprising at least one processor and/or at least one circuit which functions as: an acquiring unit configured to acquire shake information detected by a first detector configured to detect shake of the image capturing apparatus; a determining unit configured to determine whether a first characteristic of the first detector is better than a second characteristic of a second detector included in the second image blur correction control apparatus; a first deciding unit configured to, in a case where the first characteristic is better than the second characteristic, decide a first cutoff frequency based on the shake information detected by the first detector; a transmitting unit configured to, in the case where the first characteristic is better than the second characteristic, transmit the first cutoff frequency to the second image blur correction control apparatus as a cutoff frequency to be used by the second image blur correction control apparatus; a receiving unit configured to, in a case where the first characteristic is not better than the second characteristic, receive a second cutoff frequency from the second image blur correction control apparatus; a filtering unit configured to perform filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and a second deciding unit configured to decide a correction amount based on the filter-processed shake information and the predetermined sharing rule.

According to a second aspect of the present invention, there is provided a camera body comprising: the image blur correction control apparatus according to the first aspect; an image sensor; and at least one processor and/or at least one circuit which functions as a correcting unit configured to drive the image sensor in a direction orthogonal to an optical axis, in accordance with the correction amount.

According to a third aspect of the present invention, there is provided a camera body comprising: the image blur correction control apparatus according to the first aspect; an image sensor; and at least one processor and/or at least one circuit which functions as a correcting unit configured to change a position acquired as an image in an image capturing signal generated by the image sensor, in accordance with the correction amount.

According to a fourth aspect of the present invention, there is provided a lens unit comprising: the image blur correction control apparatus according to the first aspect; a shooting optical system including a correction lens; and at least one processor and/or at least one circuit which functions as a correcting unit configured to drive the correction lens in a direction orthogonal to an optical axis, in accordance with the correction amount.

According to a fifth aspect of the present invention, there is provided an image blur correction control method executed by an image blur correction control apparatus configured to correct image blur of an image capturing apparatus through sharing with a second image blur correction control apparatus in accordance with a predetermined sharing rule, comprising: acquiring shake information detected by a first detector configured to detect shake of the image capturing apparatus; determining whether a first characteristic of the first detector is better than a second characteristic of a second detector included in the second image blur correction control apparatus; in a case where the first characteristic is better than the second characteristic, deciding a first cutoff frequency based on the shake information detected by the first detector; in the case where the first characteristic is better than the second characteristic, transmitting the first cutoff frequency to the second image blur correction control apparatus as a cutoff frequency to be used by the second image blur correction control apparatus; in a case where the first characteristic is not better than the second characteristic, receiving a second cutoff frequency from the second image blur correction control apparatus; performing filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and deciding a correction amount based on the filter-processed shake information and the predetermined sharing rule.

According to a sixth aspect of the present invention, there is provided a non-transitory computer-readable storage medium which stores a program for causing a computer of an image blur correction control apparatus to execute an image blur correction control method for correcting image blur of an image capturing apparatus through sharing with a second image blur correction control apparatus in accordance with a predetermined sharing rule, the method comprising: acquiring shake information detected by a first detector configured to detect shake of the image capturing apparatus; determining whether a first characteristic of the first detector is better than a second characteristic of a second detector included in the second image blur correction control apparatus; in a case where the first characteristic is better than the second characteristic, deciding a first cutoff frequency based on the shake information detected by the first detector; in the case where the first characteristic is better than the second characteristic, transmitting the first cutoff frequency to the second image blur correction control apparatus as a cutoff frequency to be used by the second image blur correction control apparatus; in a case where the first characteristic is not better than the second characteristic, receiving a second cutoff frequency from the second image blur correction control apparatus; performing filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and deciding a correction amount based on the filter-processed shake information and the predetermined sharing rule.

Further features of the present invention will become apparent from the following description of exemplary embodiments with reference to the attached drawings.

BRIEF DESCRIPTION OF THE DRAWINGS

FIGS. 1A and 1B are block diagrams showing the configuration of an image capturing apparatus that includes a camera body 100 and a lens unit 150.

FIGS. 2A and 2B are block diagrams showing detailed configurations of an image blur correction control system realized by a lens-side image stabilization control unit 126 and an image blur correction system realized by a camera-side image stabilization control unit 133.

FIGS. 3A and 3B are schematic diagrams detailing changes in correction amount ratio and frequency band.

FIG. 7 is a diagram illustrating the processing of step S107 in FIG. 6A in detail.

FIGS. 8A and 8B are diagrams illustrating the processing of step S109 in FIG. 6A in detail.

DESCRIPTION OF THE EMBODIMENTS

Figure 1A:
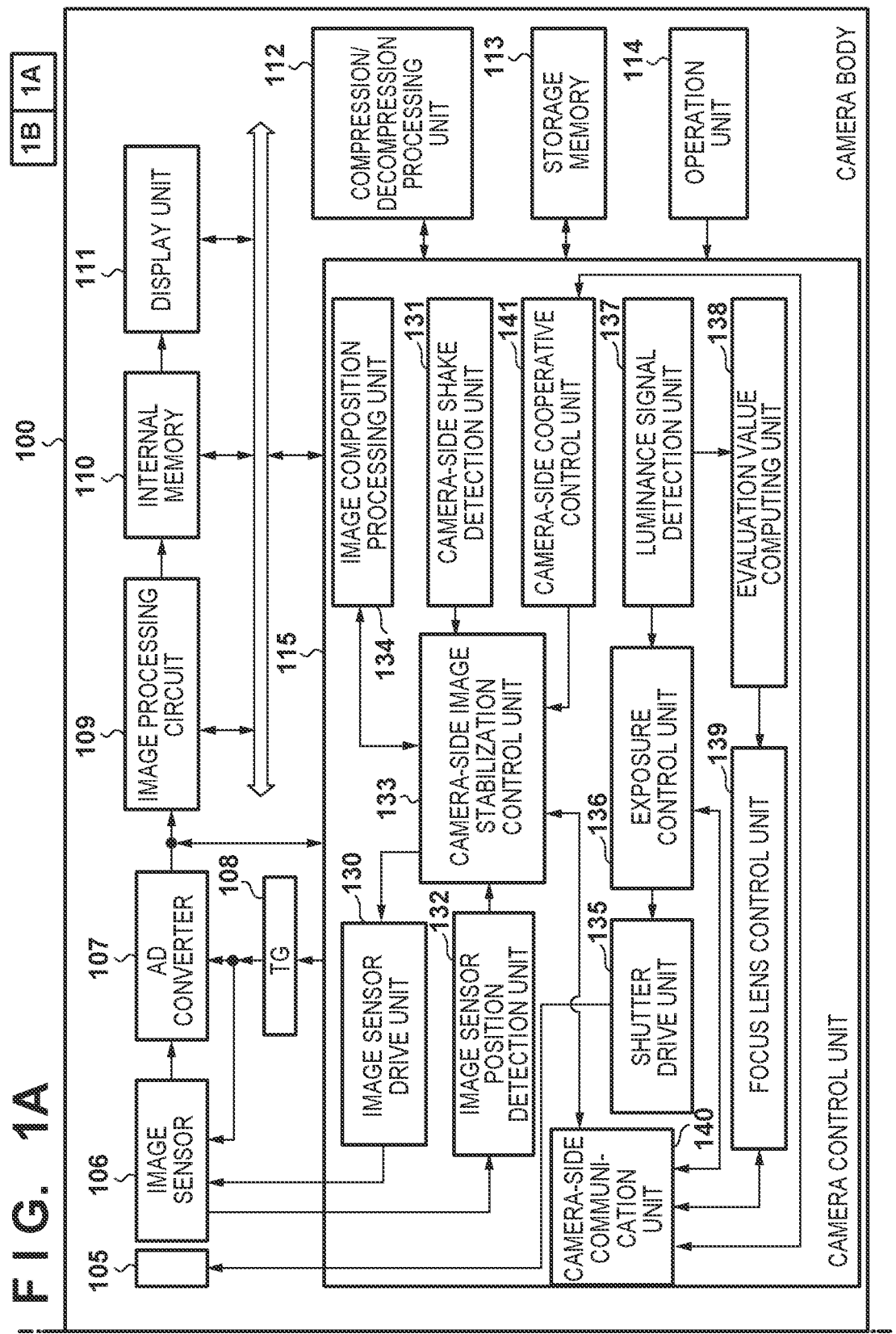

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIGS. 1A and 1B are block diagrams showing the configuration of an image capturing apparatus that includes a camera body 100 and a lens unit 150. The camera body 100 and the lens unit 150 both include an image blur correction control apparatus. In FIGS. 1A and 1B, a zoom lens 101 moves in an optical axis direction to optically change the focal length of a shooting optical system 200 (shooting lens) that forms a subject image, and change the shooting angle of view. An image blur correction lens 102 optically corrects image blur caused by image capturing apparatus shake, by moving in a direction perpendicular to the optical axis. A focus lens 103 adjusts the focus position optically by moving in the optical axis direction. A diaphragm 104 and a shutter 105 are able to adjust the amount of light by opening and closing, and are used in exposure control.

Light that passes through the shooting optical system 200 is received by an image sensor 106 that uses a CCD (Charge-Coupled Device) sensor, a CMOS (Complementary Metal-Oxide-Semiconductor) sensor or the like, and is converted from a light signal into an electrical signal. Also, the image sensor 106 corrects image blur optically by moving in a direction perpendicular to the optical axis similarly to the image blur correction lens 102.

An AD converter 107 performs denoising, gain adjustment and AD conversion on an image capturing signal read out from the image sensor 106. A TG (Timing Generator) 108 controls the drive timing of the image sensor 106 and the output timing of the AD converter 107, in accordance with commands from a camera control unit 115.

An image processing circuit 109, after performing processing such as pixel interpolation and color conversion on the output from the AD converter 107, sends processed image data to the internal memory 110. A display unit 111 displays shooting information and the like, along with image data that is held in an internal memory 110.

A compression/decompression processing unit 112 performs compression processing or decompression processing on data that is saved in the internal memory 110, according to the image format. A storage memory 113 stores various data such as parameters. An operation unit 114 is a user interface for a user to perform various menu operations and a mode switching operation.

The camera control unit 115 is constituted by a computing apparatus such as a CPU (Central Processing Unit), and performs overall control of the camera body 100 by executing various control programs that are stored in the internal memory 110 according to operations by the user on the operation unit 114. Also, the control programs include programs for performing zoom control, image blur correction control, auto exposure control, autofocus control, and processing for detecting the face of the subject, for example. A lens control unit 142 is constituted by a computing apparatus such as a CPU (Central Processing Unit), and performs overall control of the lens unit 150 by executing various control programs that are stored in an internal memory (not shown) provided in the lens unit 150.

Note that at least some of the functions of the blocks that are illustrated within the camera control unit 115 may be implemented by a different circuit from the camera control unit 115. Similarly, at least some of the functions of the blocks that are illustrated within the lens control unit 142 may be implemented by a different circuit from the lens control unit 142.

A camera-side communication unit 140 and a lens-side communication unit 128 are used in order to perform information transmission between the camera body 100 and the lens unit 150.

A diaphragm drive unit 120 and a shutter drive unit 135 drive the diaphragm 104 and the shutter 105. A luminance signal detection unit 137 detects a signal that is read out from the image sensor 106 and has passed through the AD converter 107 as the luminance of the subject and the scene. An exposure control unit 136 computes exposure values (aperture value and shutter speed) based on luminance information obtained by the luminance signal detection unit 137, and notifies the computation results to the diaphragm drive unit 120 and the shutter drive unit 135. The exposure control unit 136 also simultaneously performs control for amplifying the image capturing signal read out from the image sensor 106. Auto exposure control (AE control) is thereby performed.

A zoom lens drive unit 124 drives the zoom lens 101 and changes the angle of view. A zoom control unit 127 performs position control of the zoom lens 101 in accordance with a zoom operation instruction by the operation unit 114.

A focus lens drive unit 121 drives the focus lens 103. An evaluation value computing unit 138, after extracting a specific frequency component from the luminance information obtained by the luminance signal detection unit 137, calculates a contrast evaluation value based thereon. A focus lens control unit 139 gives a command for driving the focus lens 103 by a predetermined drive amount over a predetermined range. At the same time, the focus lens control unit 139 acquires evaluation values which are the computation results of the evaluation value computing unit 138 at respective focus lens positions. The focus lens control unit 139 calculates a defocus amount of a contrast AF method from the focus lens position at which the contrast evaluation value change curve peaks, and notifies the calculated defocus amount to the focus lens drive unit 121. Autofocus control (AF control) for focusing the light beam on the surface of the image sensor 106 is performed, by driving the focus lens 103 to the focus position with the focus lens drive unit 121. Although the contrast AF method is described here, a phase detection AF method may be used. The phase detection AF method is realizable by any known technology.

A camera-side shake detection unit 131 detects shake and vibration (hereinafter, also simply "shake") applied to the camera body 100. A lens-side shake detection unit 125 that detects shake applied to the lens unit 150 is also disposed on the lens unit 150 side, separately to the camera-side shake detection unit 131 disposed on the camera body 100 side. Generally, a gyroscope sensor is used as the sensor for detecting shake, and the angular velocity of shake is detected by the gyroscope sensor.

Note that since the camera body 100 and the lens unit 150 are integrally connected in the image capturing apparatus, the shake detected by the camera-side shake detection unit 131 and the lens-side shake detection unit 125 substantively corresponds to image capturing apparatus shake. Accordingly, unless a strict distinction is necessary, both shake applied to the camera body 100 and shake applied to the lens unit 150 may simply be called "shake" or "image capturing apparatus shake". As will be described later, however, characteristics differ between the camera side shake detection unit 131 and the lens-side shake detection unit 125, and thus data on shake that is detected with the camera-side shake detection unit 131 and data on shake that is detected with the lens-side shake detection unit 125 do not necessarily correspond.

An image sensor drive unit 130 drives the image sensor 106. An image sensor position detection unit 132 detects the position of the image sensor 106 which can be driven in a direction perpendicular to the optical axis.

The camera-side image stabilization control unit 133 acquires information on the amount of shake (shake information) detected by the camera-side shake detection unit 131, calculates the amount of image blur correction for suppressing shake, based on the acquired shake information, and performs control for driving the image sensor 106 in a direction perpendicular to the optical axis.

An image blur correction lens drive unit 122 drives the image blur correction lens 102. An image blur correction lens position detection unit 123 detects the position of the image blur correction lens 102 in a direction perpendicular to the optical axis. The lens-side image stabilization control unit 126 calculates the amount of image blur correction for suppressing shake, based on the amount of shake detected by the lens-side shake detection unit 125, and performs control for driving the image blur correction lens 102 in a direction perpendicular to the optical axis.

An image composition processing unit 134 converts the image blur correction amount calculated by the lens-side image stabilization control unit 126 into an image shift amount between images, by multiplying the image blur correction amount by an appropriate coefficient. Image blur that occurs between images can be corrected, by appropriately controlling the scan range of the next image based on this image shift amount. By executing this control continuously, electronic image stabilization control that suppresses image degradation due to hand shake can be performed.

Figure 2A:
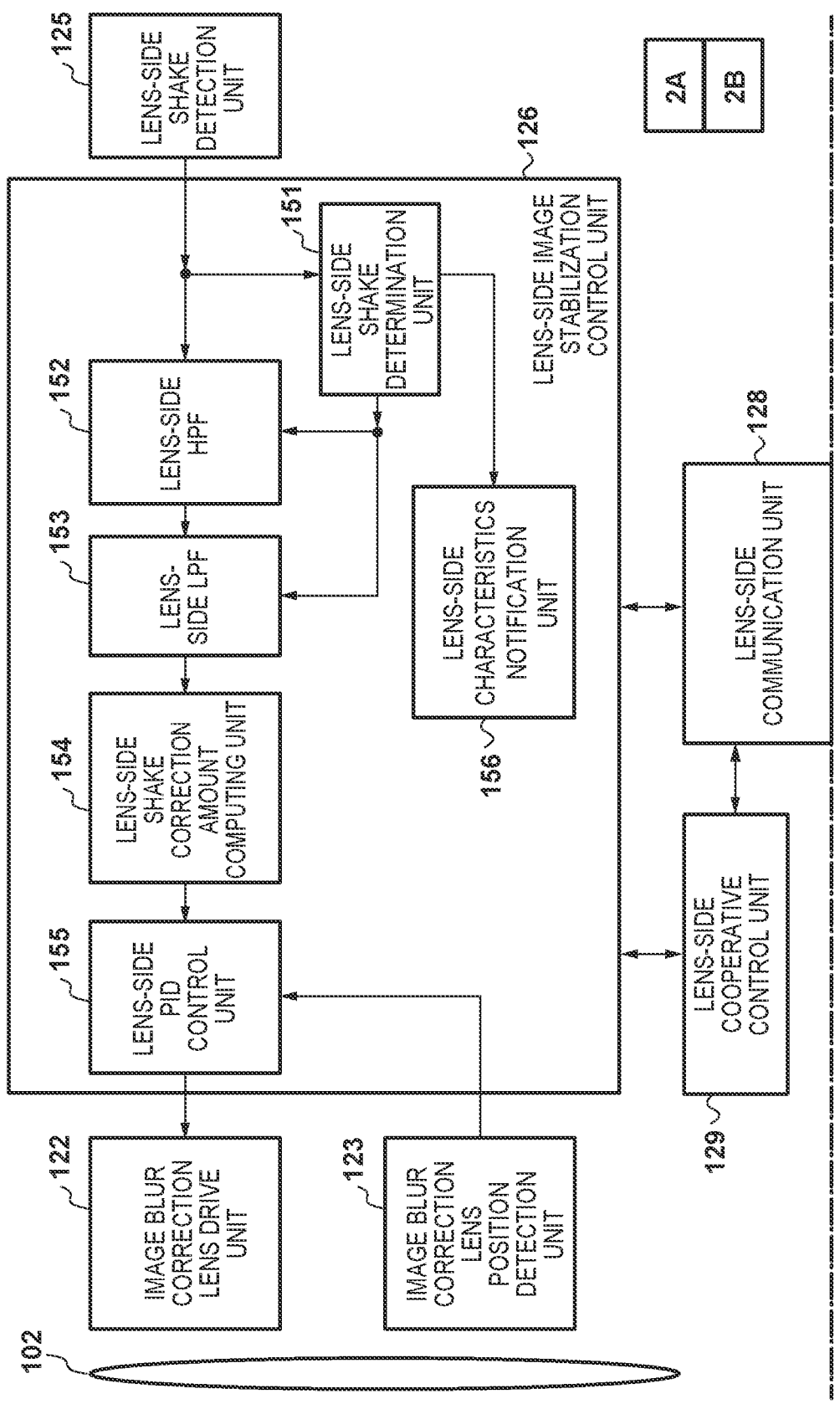

FIGS. 2A and 2B are block diagrams showing detailed configurations of an image blur correction control system realized by the lens-side image stabilization control unit 126 and an image blur correction system realized by the camera-side image stabilization control unit 133. A lens-side HPF 152 and a camera-side HPF 162 remove an offset component that is included in the shake frequencies respectively detected by the lens-side shake detection unit 125 and the camera-side shake detection unit 131. That is, the lens-side HPF 152 and the camera-side HPF 162 extract a high-frequency component. Note that HPF stands for high-pass filter.

A lens-side LPF 153 and a camera-side LPF 163 integrate the shake angular velocity with a shake angle. Note that LPF stands for low-pass filter.

A lens-side cooperative control unit 129 and a camera-side cooperative control unit 141 control computation of the shake correction amount, based on the correction amount ratio of the image blur correction lens 102 and the image sensor 106, the frequency band and the correction range (collectively referred to as cooperative control characteristics).

A lens-side shake correction amount computing unit 154 and a camera-side shake correction amount computing unit 164 compute the shake correction amount, by multiplying a shake angle reflecting the cooperative control characteristics by a gain relating to zoom magnification or subject distance. The correction amount ratio and the frequency band are changeable (described in detail later).

A lens-side PID control unit 155 and a camera-side PID control unit 165 perform PID control (ratio control, integral control, and micro-control) on the deviation between the current position and the target position in the respective correction amounts of the image blur correction lens 102 and the image sensor 106. Since PID control is a commonly used technology, a detailed description thereof will be omitted.

A lens-side shake determination unit 151 determines situations such as hand shake, a slow panning operation, a fast panning operation and a sudden, large swinging motion, based on the amplitude and frequency of shake detected by the lens-side shake detection unit 125. Similarly, a camera-side shake determination unit 161 determines situations such as hand shake, a slow panning operation, a fast panning operation and a sudden, large swinging motion, based on the amplitude and frequency of shake detected by the camera-side shake detection unit 131. The lens-side shake determination unit 151 and the camera-side shake determination unit 161 achieve both image stabilization performance and image quality by changing the cutoff frequency of the HPF and the LPF according to the determination result.

Generally, image stabilization performance tends to rise when the cutoff frequency of the HPF is lowered, and image stabilization performance is maximized when the cutoff frequency is at a minimum. On the other hand, image stabilization performance tends to fall when the cutoff frequency of the HPF is raised, and instead the correction member is prevented from hitting near the correction limit, and it becomes possible to respond quickly to large shake. In the case of the LPF, the characteristics are reversed, and image stabilization performance tends to rise when the cutoff frequency is raised, and tends to fall when the cutoff frequency is lowered. This change in the cutoff frequency will be described in detail later.

A lens-side characteristics notification unit 156 converts the situation determined by the lens-side shake determination unit 151 into information that can be communicated between the lens unit 150 and the camera body 100. A camera-side characteristics notification unit 166 converts the situation determined by the camera-side shake determination unit 161 into information that can be communicated between the lens unit 150 and the camera body 100. The lens-side communication unit 128 and the camera-side communication unit 140 transmit information to each other between the lens unit 150 and the camera body 100.

FIGS. 3A and 3B are schematic diagrams detailing changes in correction amount ratio and frequency band. FIG. 3A shows amplitude division. A pre-division correction amount waveform and post-division correction amount waveforms represent time on the X-axis and correction amount on the Y-axis. In the center are block diagrams of dividers.

The correction amount that is represented with the pre-division correction amount waveform is integrated at a predetermined ratio α or 1-α. Here, α is a value from 0 to 1 inclusive. As an example, in the case where α is 0.5, the correction amount is divided at a ratio of 50:50 between the top and bottom, that is, between the camera side (camera body 100 side) and the lens-side (lens unit 150 side), as with the post-division correction amount waveforms shown in FIG. 3A.

FIG. 3B shows frequency division. A pre-division correction amount waveform and post-division correction amount waveforms represent time on the X-axis and correction amount on the Y-axis. In the center are block diagrams of dividers.

The correction amount that is represented with the pre-division correction amount waveform undergoes a filter computation at a predetermined cutoff frequency. As an example, in the case where a cutoff frequency fc is 3 Hz, the correction amount is divided between high frequencies at the top and low frequencies at the bottom, that is, between the camera side and the lens side, as with the post-division correction amount waveforms shown in FIG. 3B.

Figure 4:
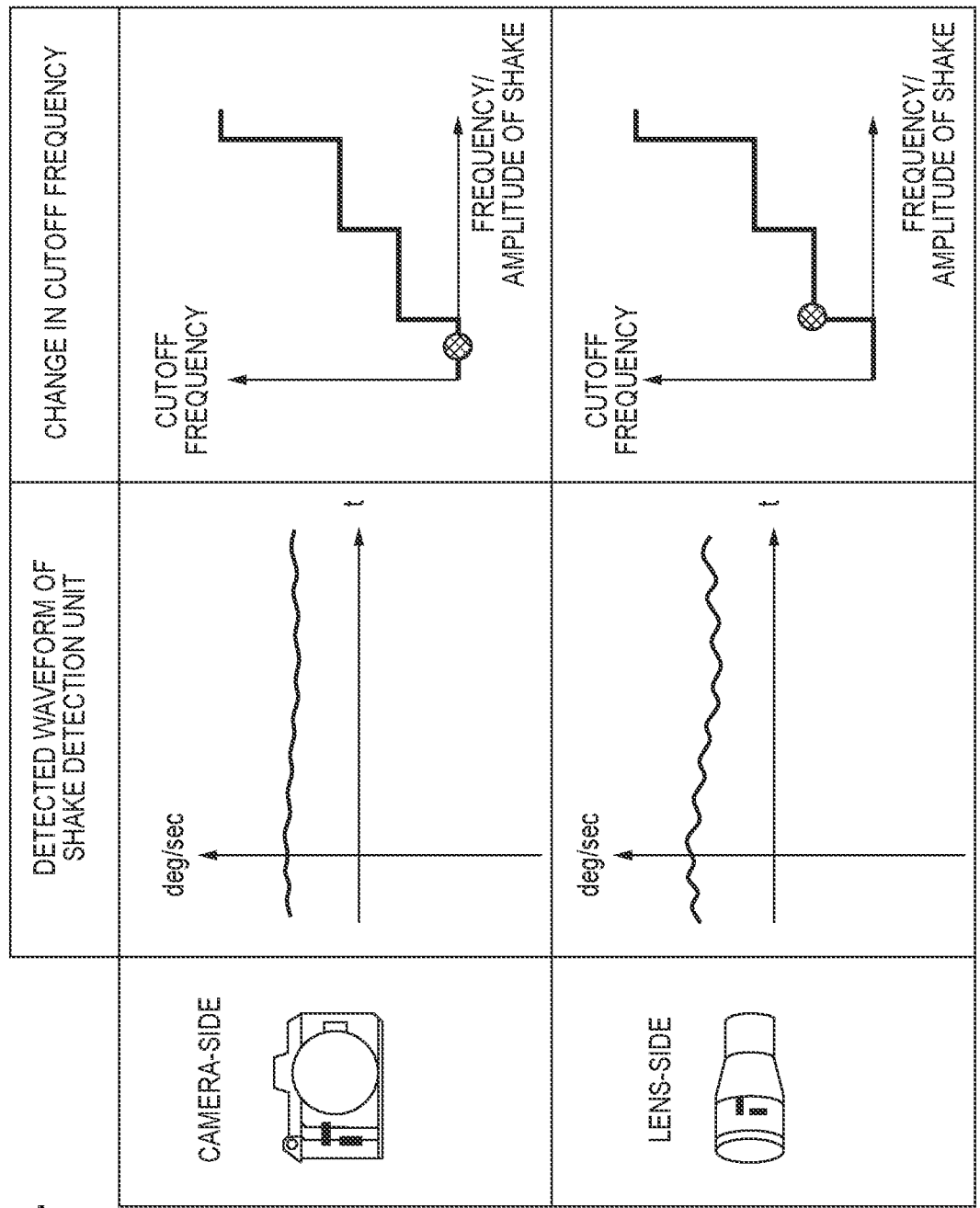
FIG. 4 is a schematic diagram illustrating the relationship between detected waveforms of a lens-side shake detection unit 125 and a camera-side shake detection unit 131 and a change in cutoff frequency.

FIG. 4 is a schematic diagram illustrating the relationship between detected waveforms of the lens-side shake detection unit 125 and the camera-side shake detection unit 131 and a change in cutoff frequency. As an example, it is assumed that gyroscopes having different characteristics are installed on the camera side and the lens side. The detected waveforms of the shake detection units represent time on the X-axis and angular velocity on the Y-axis. The change in cutoff frequency represents the frequency or amplitude of shake on the X-axis and cutoff frequency on the Y-axis.

Here, gyroscopes having different characteristics refers, specifically, to differences in the magnitude of noise of a low-frequency component and differences in the magnitude of a drift component due to temperature variation. Generally, the tendency is for noise of the low-frequency component to be lower and the drift component due to temperature variation to also be smaller with a more expensive gyroscope. Such a gyroscope will be referred to as a gyroscope with good characteristics and other gyroscopes will be referred to as gyroscopes with normal characteristics.

In FIG. 4, it is assumed that a gyroscope with good characteristics is installed on the camera side, and a gyroscope with normal characteristics is installed on the lens side. At this time, in the case where the image capturing apparatus is panned slowly and calmly, the detected waveforms of the gyroscopes on the camera side and the lens side will be respectively like the waveforms on the left.

It is evident that the camera side continuously detects an angular velocity that is substantially parallel to elapsed time, and there is little noise of the low-frequency component. In this case, since the frequency and amplitude of shake are both extremely small, in order to maximize image stabilization performance, it is better not to raise the cutoff frequency of the HPF. Note that, although not illustrated, it is better not to lower the cutoff frequency of the LPF.

It is evident that the lens side continuously detects an angular velocity that is slightly wavy relative to elapsed time, and there is significant noise of the low-frequency component as compared with the gyroscope on the camera side. In this case, since the detected frequency and amplitude of shake have both increased though only slightly, the cutoff frequency of the HPF will be raised in this state. Note that, although not illustrated, the cutoff frequency of the LPF will be lowered.

However, the shake on the lens side is due to noise detected by the gyroscope having normal characteristics, rather than being due to the intentional slow and calm panning. Thus, not raising the cutoff frequency of the HPF (aligning the cutoff frequency with the camera side) is the appropriate processing. Note that, with regard to the LPF, not lowering the cutoff frequency (aligning the cutoff frequency with the camera side) is the appropriate processing.

Both image stabilization performance and appearance (image quality) can thereby be optimally set, when the lens side and the camera side perform cooperative control.

Figure 5:
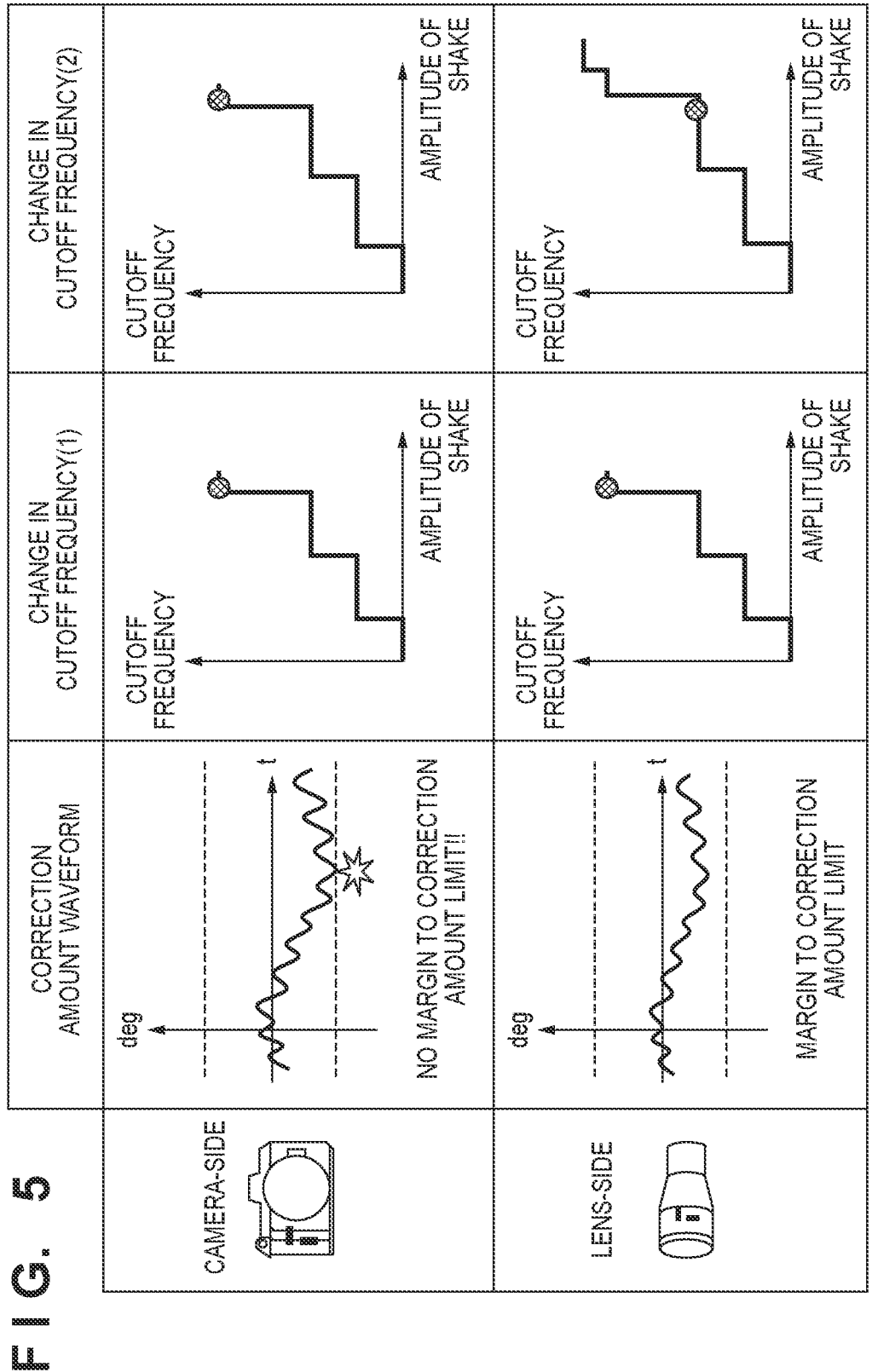
FIG. 5 is a schematic diagram illustrating the relationship between correction amount waveforms and a change in cutoff frequency.

FIG. 5 is a schematic diagram illustrating the relationship between correction amount waveforms and a change in cutoff frequency. While FIG. 4 illustrates the advantages of aligning the cutoff frequencies on the camera side and the lens side, cases where it is better not to align the cutoff frequencies will now be described.

As an example, the correction amount ratios on the camera side and the lens side are assumed to be 60% and 40% by amplitude division. At this time, there is no margin to the correction amount limit with the correction amount waveform on the camera side with respect to large shake. Thus, in cutoff frequency change (1), the cutoff frequency is greatly raised with respect to the amplitude of large shake, and action for returning the correction member to the center from the correction amount limit is increased.

Here, in the case where the cutoff frequency on the lens side is aligned with the camera side, the cutoff frequency will be greatly raised, despite there being a margin to the correction amount limit on the lens side. In this case, the width of the margin to the correction amount limit is not effectively utilized.

In view of this, in filter cutoff frequency change (2), the width of the margin to the correction amount limit can be effectively utilized, by changing the cutoff frequency table (corresponds to the graphs in FIG. 5) on the lens side, without changing the cutoff frequency table on the camera side. The appearance with respect to large shake can thereby be improved.

Although amplitude division was described as an example, the same can be said for frequency division. In the case of frequency division, the amplitude of the correction amount tends to be greater for low frequencies as compared with high frequencies. That is, a state where there is no margin to the correction amount limit is more likely to occur with low frequencies.

In the case where the camera side handles low frequencies, the width of the margin to the correction amount limit can be effectively utilized, by changing the cutoff frequency table on the camera side, without changing the cutoff frequency table on the lens side.

Figure 6A:
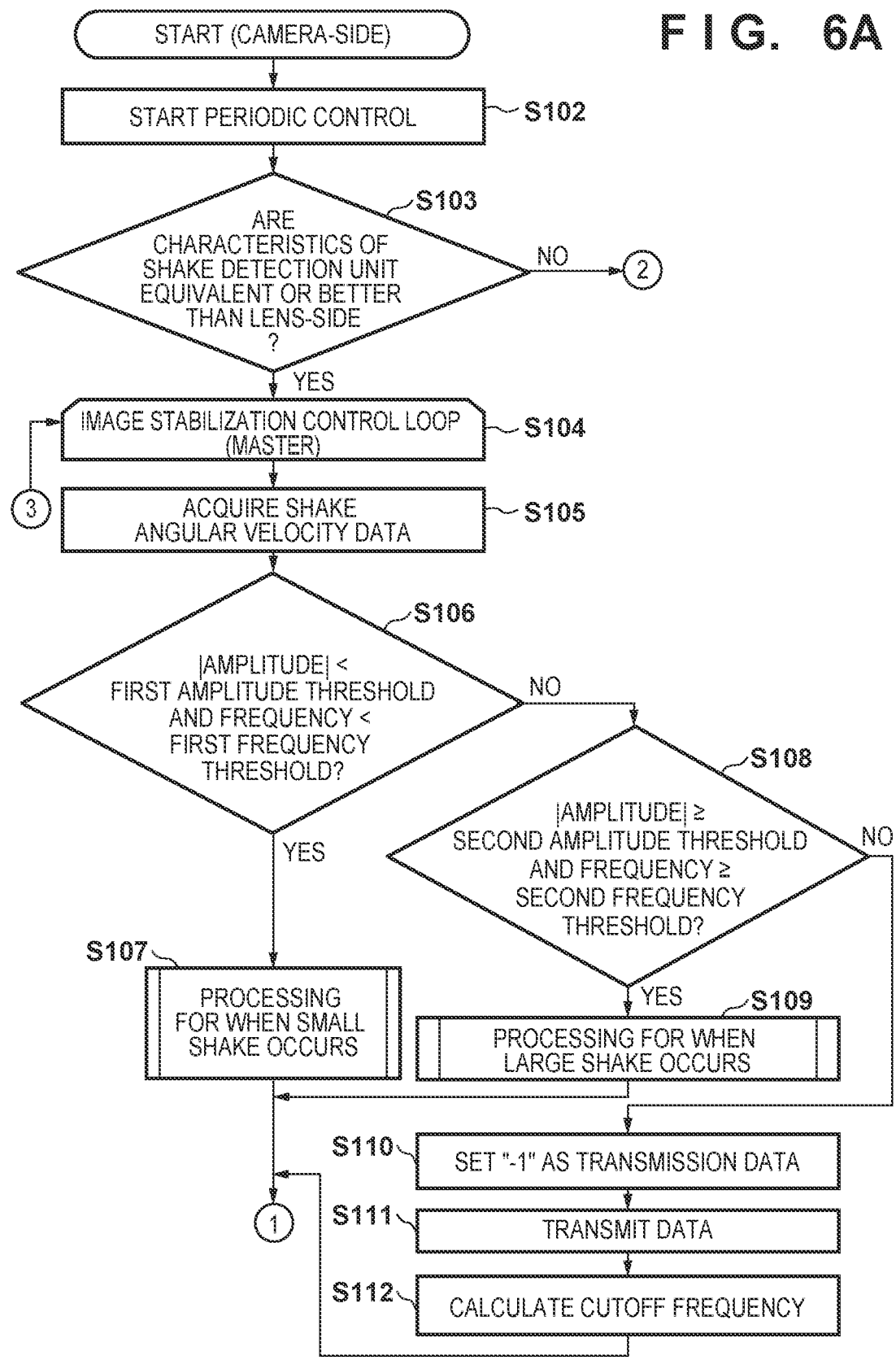
FIGS. 6A-6C are flowcharts of image blur correction processing by the camera body 100.
Figure 6B:
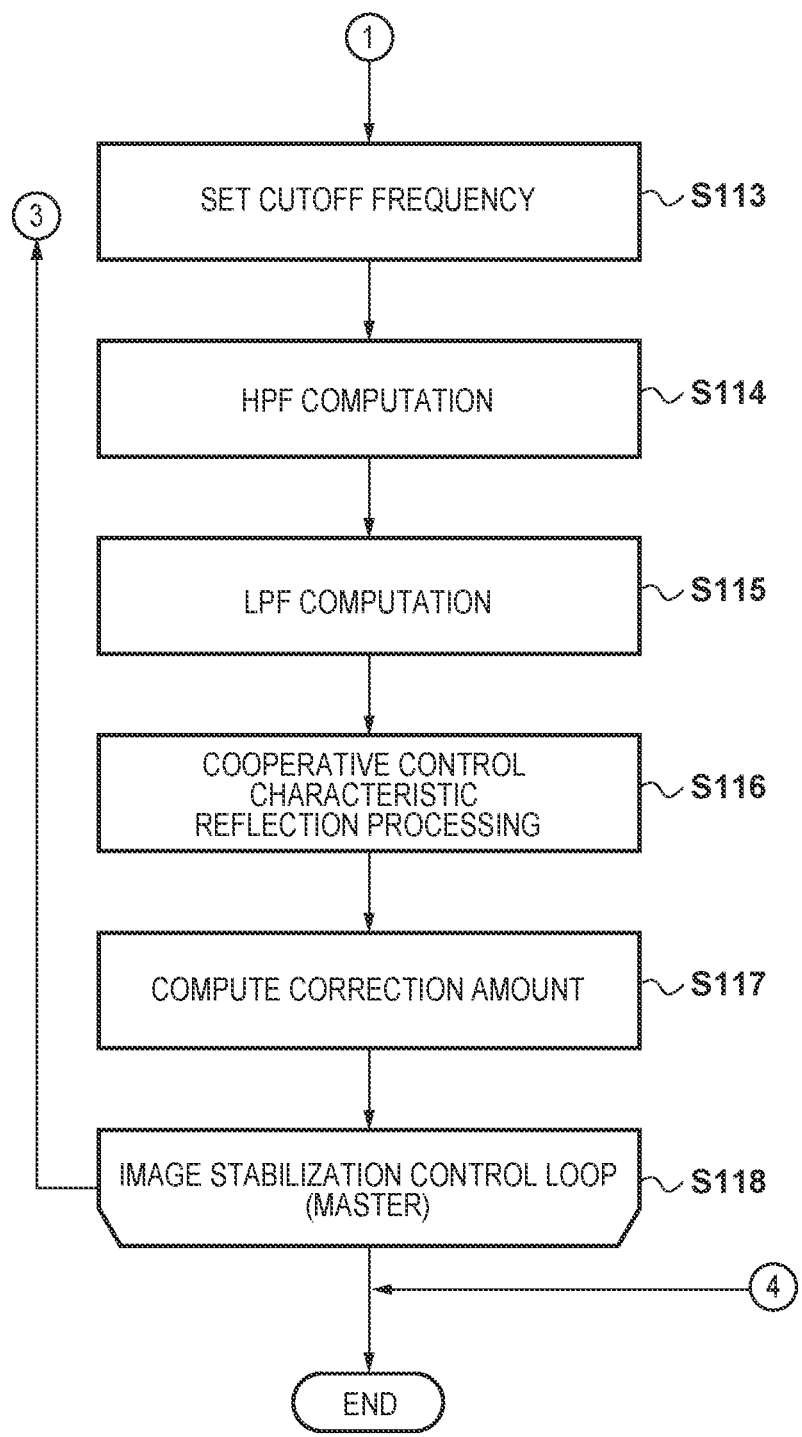
Figure 6C:
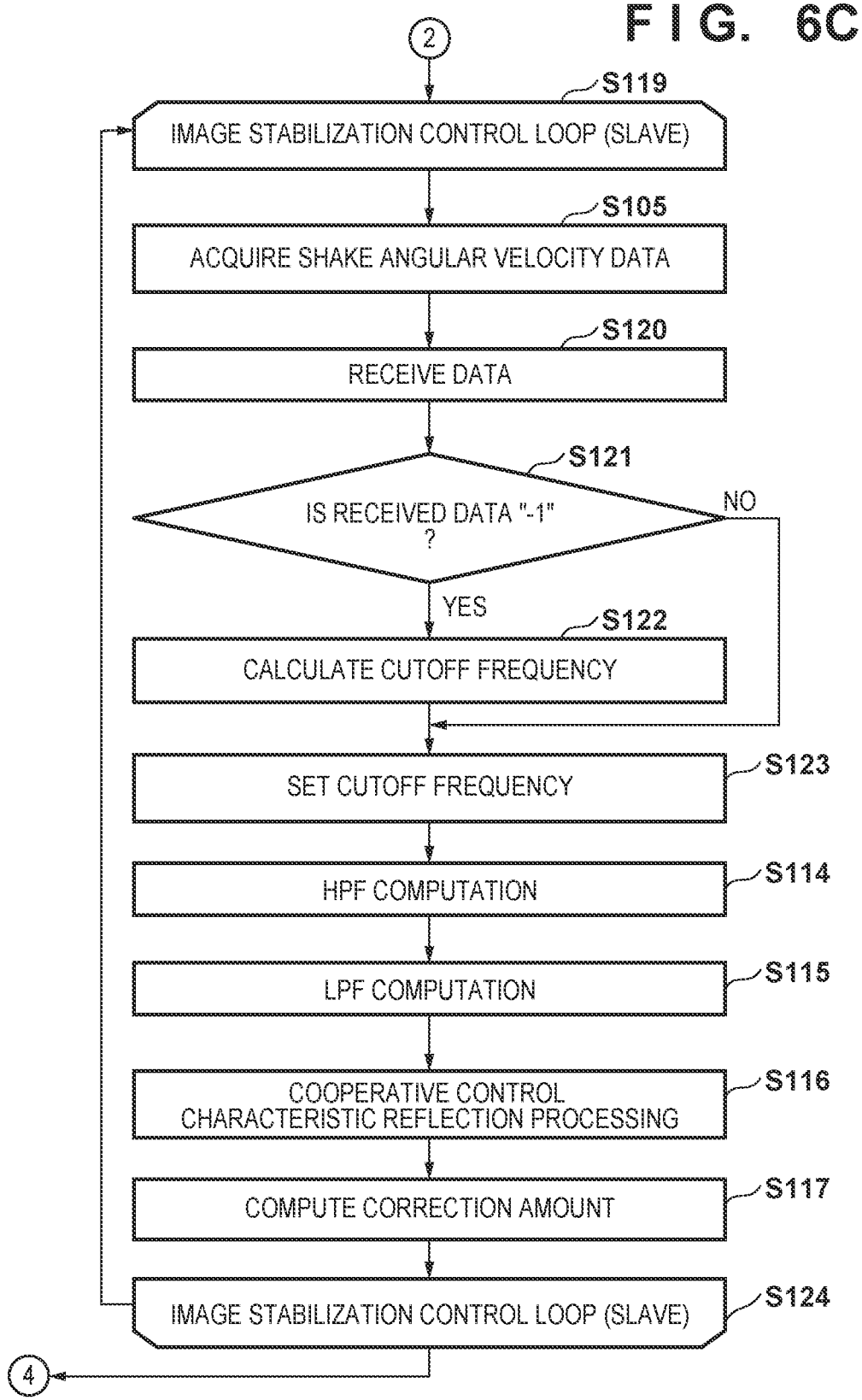

FIGS. 6A-6C are flowcharts of image blur correction processing by the camera body 100. In step S102, the camera-side image stabilization control unit 133 starts periodic control. Here, the cycle of image stabilization control loop processing (steps S104 and S119) which will be described later is decided.

In step S103, the camera-side image stabilization control unit 133 determines whether the characteristics of the camera-side shake detection unit 131 are equivalent or better as compared with the characteristics of the lens-side shake detection unit 125. The characteristics being better means that the noise level is lower and the temperature drift component is smaller. If the characteristics are equivalent or better, the processing advances to step S104, and if that is not the case, the processing advances to step S119. In the case of the former, the camera body 100 acts as the master in relation to deciding the cutoff frequency, and, in the case of the latter, the camera body 100 acts as the slave in relation to deciding the cutoff frequency.

In step S104, the camera-side image stabilization control unit 133 starts an image stabilization control loop in which the camera body 100 is the master. On the other hand, in step S119, the camera-side image stabilization control unit 133 starts an image stabilization control loop in which the camera body 100 is the slave.

Initially, the image stabilization control loop in which the camera body 100 is the master will be described. In step S105, the camera-side image stabilization control unit 133 acquires shake angular velocity data acquired by the camera-side shake detection unit 131.

In step S106, the camera-side shake determination unit 161 determines whether the shake is small shake, based on the shake angular velocity data acquired in step S105. As mentioned in the description of FIG. 4, there are cases where not raising the cutoff frequency of the HPF with respect to small shake of a level equivalent to noise (aligning the cutoff frequencies on the camera side and the lens side) is the appropriate processing. Also, there are cases where not lowering the cutoff frequency of the LPF with respect to small shake of a level equivalent to noise (aligning the cutoff frequencies on the camera side and the lens side) is the appropriate processing. Thus, if the absolute value of the amplitude of the shake is less than a first amplitude threshold and the frequency of the shake is less than a first frequency threshold, it is judged that the shake angular velocity data corresponds to small shake of a level equivalent to noise (shake satisfies a first criterion), and the processing advances to step S107. In step S107, processing for when small shake occurs is performed.

Note that the absolute value of the amplitude of the shake being less than the first amplitude threshold and the frequency of the shake being less than the first frequency threshold is merely one example of the criterion corresponding to small shake (first criterion). Accordingly, it may be determined whether the criterion corresponding to small shake (first criterion) is satisfied based on another criterion.

The processing of step S107 will be described in detail with reference to FIG. 7. In step S201, the camera-side image stabilization control unit 133 calculates a cutoff frequency that corresponds to small shake. Note that although the cutoff frequency is respectively calculated for the HPF and the LPF, hereinafter, for simplification of description, the description will simply refer to the "cutoff frequency" without specifying the HPF and the LPF. In step S204, the camera-side image stabilization control unit 133 sets, as transmission data, a cutoff frequency table number corresponding one to one with the cutoff frequency calculated in step S201. In step S205, the camera-side image stabilization control unit 133 transmits the data of the table number set in step S204 to the lens unit 150 serving as the slave, via the camera-side communication unit 140. Note that the cutoff frequency calculated in step S201 may itself be transmitted to the lens unit 150 instead of a table number.

Referring again to FIG. 6A, if it is determined in step S106 that the shake is not small shake, the camera-side shake determination unit 161, in step S108, determines whether the detected shake is large shake. As mentioned in the description of FIG. 5, there are cases where changing the cutoff frequencies on the camera side and the lens side with respect to large shake is appropriate processing that effectively utilizes the width of the margin to the correction amount limit. Thus, if the absolute value of the amplitude of the shake is greater than or equal to a second amplitude threshold and the frequency of the shake is greater than or equal to a second frequency threshold, it is judged that the shake angular velocity data corresponds to a large shake that exceeds normal hand shake (shake satisfies a second criterion), and the processing advances to step S109. In step S109, processing for when large shake occurs is performed.

Note that the absolute value of the amplitude of the shake being greater than or equal to the second amplitude threshold and the frequency of the shake being greater than or equal to the second frequency threshold is merely one example of the criterion corresponding to large shake (second criterion). Accordingly, it may be determined whether the criterion corresponding to large shake (second criterion) is satisfied based on another criterion.

Figure 8B:
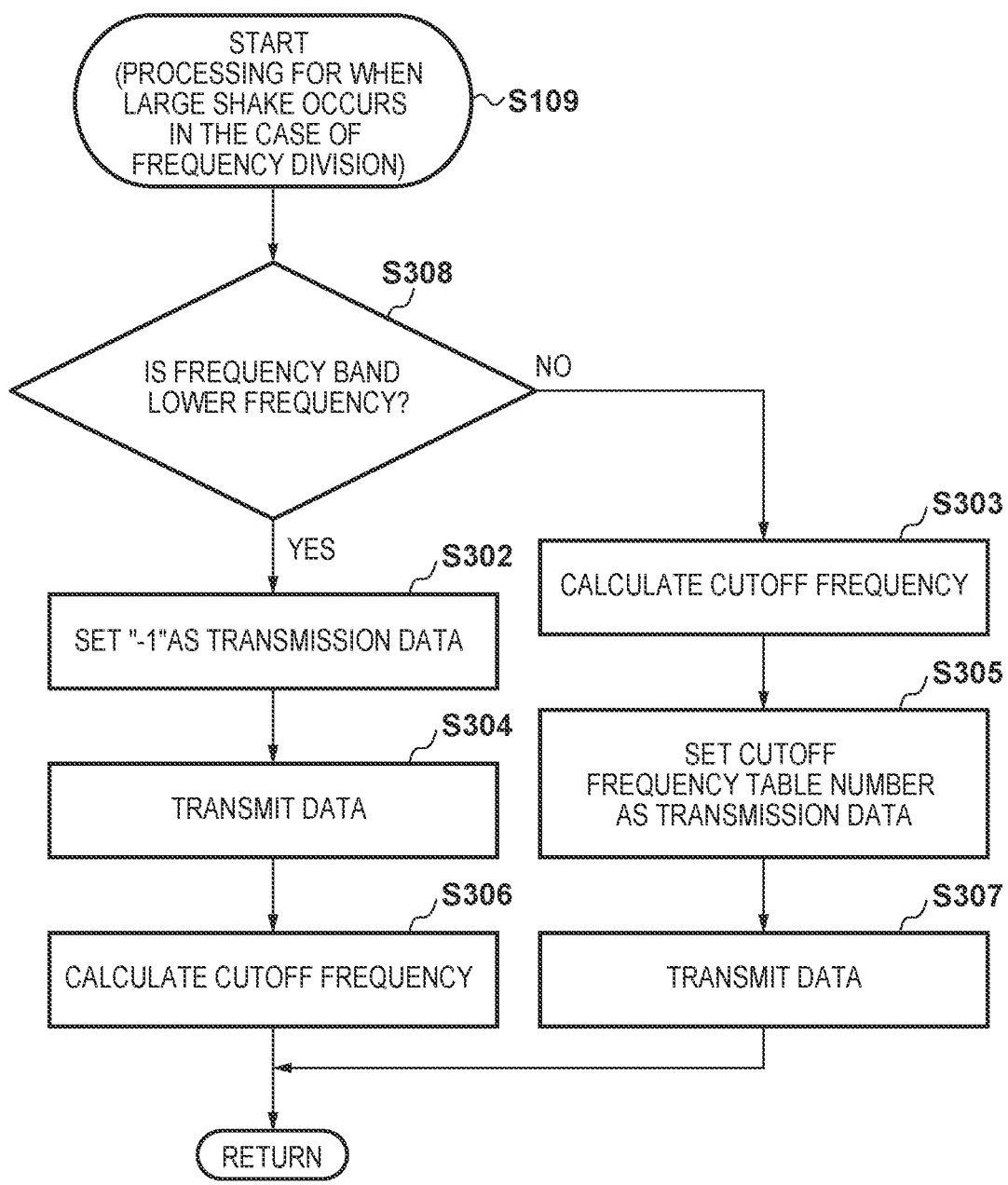

The processing of step S109 will be described in detail with reference to FIGS. 8A and 8B. As described with reference to FIGS. 3A and 3B, methods of dividing the correction amount in cooperative control (sharing rule relating to sharing of image blur correction between the camera side and the lens side) include amplitude division and frequency division. FIG. 8A is a flowchart of processing for when large shake occurs in the case of amplitude division.

In step S301, the camera-side image stabilization control unit 133 determines whether the correction amount ratio on the camera side is large as compared with the lens side. The correction amount ratio changes according to the zoom magnification and the mode of the image capturing apparatus that are currently set. The case where the correction amount ratio is large means that the width of the margin to the correction amount limit on the lens side is large as compared with the camera side. Thus, the width of the margin can be effectively utilized by appropriately changing the cutoff frequency on the lens side (lowering the cutoff frequency of the HPF or raising the cutoff frequency of the LPF). Thus, in step S302, the camera-side image stabilization control unit 133 sets, as transmission data, "−1" which is data (instruction information) instructing the lens side to calculate the cutoff frequency itself.

In step S304, the camera-side image stabilization control unit 133 transmits "−1" to the lens unit 150, via the camera-side communication unit 140. In step S306, the camera-side image stabilization control unit 133 calculates a cutoff frequency that corresponds to large shake. The cutoff frequency calculated here is a cutoff frequency that is only used on the camera side and is not transmitted to the lens side, and thus coordinating with the lens side does not need to be taken into consideration. As an example, it is also possible for the camera side to change the cutoff frequency to be at a maximum, while the lens side sets the cutoff frequency moderately.

If it is determined in step S301 that the correction amount ratio on the camera side is not large as compared with the lens side (camera side handles less than half of the amplitude of shake), the camera-side image stabilization control unit 133, in step S303, calculates a cutoff frequency that corresponds to large shake. In step S305, the camera-side image stabilization control unit 133 sets, as transmission data, a cutoff frequency table number corresponding one to one to the cutoff frequency calculated in step S303. In step S307, the camera-side image stabilization control unit 133 transmits the data of the table number set in step S305 to the lens unit 150 serving as the slave, via the camera-side communication unit 140. Note that the cutoff frequency calculated in step S303 may itself be transmitted to the lens unit 150 instead of a table number.

FIG. 8B is a flowchart of processing for when large shake occurs in the case of frequency division. In step S308, the camera-side image stabilization control unit 133 determines whether the frequency band to be corrected on the camera side is low frequency as compared with the lens side. The frequency band changes according to the zoom magnification and the mode of the image capturing apparatus that are currently set. In the case where the frequency band is low frequency, the lens side is high frequency and thus the correction amount limit is not easily reached as compared with the camera side. That is, the width of the margin to the correction amount limit on the lens side is large as compared with the camera side. Thus, the width of the margin can be effectively utilized, by appropriately changing the cutoff frequency on the lens side. Thus, if it is determined in step S308 that the frequency band to be corrected on the camera side is low frequency as compared with the lens side, the processing advances to step S302. If that is not the case (if the camera side handles the high frequency component of shake), the processing advances to step S303. The processing of steps S302 to S307 is the same as the processing of steps S302 to S307 in FIG. 8A.

Referring again to FIG. 6A, if it is determined in step S108 that the shake is not large shake, the processing advances to step S110. In this case, the shake is neither small nor large. In step S110, the camera-side image stabilization control unit 133 sets, as transmission data, "−1" which is data instructing the lens-side to calculate the cutoff frequency itself. In step S111, the camera-side image stabilization control unit 133 transmits "−1" to the lens unit 150, via the camera-side communication unit 140. In step S112, the camera-side image stabilization control unit 133 calculates the cutoff frequency on the camera side.

In step S113, the camera-side image stabilization control unit 133 sets the cutoff frequency calculated in step S107, step S109 or step S112 in the camera-side HPF 162 and the camera-side LPF 163.

In step S114, the camera-side HPF 162 performs an HPF computation, in order to remove an offset component that is produced by temperature drift of the camera-side shake detection unit 131, or the like. In step S115, the camera-side LPF 163 performs an LPF computation (integration operation), in order to convert the shake angular velocity data into shake angle data. The cutoff frequency in the filter processing of the HPF and the filter processing of the LPF is the cutoff frequency calculated in the above-mentioned step S107, step S109 or step S112.

In step S116, the camera-side cooperative control unit 141 reflects the cooperative control characteristics in the detected shake amount. Consider the case where the camera side handles 40% and the lens side handles 60%, for example, in the case of amplitude dividing the image blur correction amount between the camera side and the lens side. In this case, the camera-side cooperative control unit 141 multiplies the shake angle data after the processing of the HPF and the LPF calculated in step S115 by 40%. Also, consider the case where the camera side handles low frequencies less than 3 Hz and the lens side handles high frequencies greater than or equal to 3 Hz, for example, in the case of frequency dividing the image blur correction amount between the camera side and the lens side. In this case, the camera-side cooperative control unit 141 extracts the frequency band less than 3 Hz with the LPF from the shake angle data after the processing of the HPF and the LPF calculated in step S115. In the case where the amplitude or frequency divided shake angle exceeds the correction range on the camera side, the camera-side cooperative control unit 141 clamps the shake angle in the correction range.

In step S117, the camera-side shake correction amount computing unit 164 calculates the final shake correction amount, by multiplying the shake angle in which the cooperative control characteristics are reflected by a gain relating to zoom magnification or subject distance.

Note that the image blur correction of the camera body 100 may be either of a method that drives the image sensor 106 in a direction orthogonal to the optical axis in accordance with the correction amount, or a method that changes the position that is acquired as an image in the image capturing signal generated by the image sensor 106, in accordance with the shake correction amount. The camera-side shake correction amount computing unit 164 calculates the shake correction amount with an appropriate calculation method that depends on the method of image blur correction.

Step S118 is the end of the image stabilization control loop in which the camera body 100 is the master. The processing within the image stabilization control loop of steps S104 to S118 is repeatedly executed every control cycle set in step S102. When the image stabilization control ends due to the end of shooting or the like, the processing breaks out of the image stabilization control loop and ends.

Next, the case where the characteristics of the camera-side shake detection unit 131 are less than equivalent as compared with the characteristics of the lens-side shake detection unit 125 (case where "NO" is determined in step S103) will be described. In this case, in step S119, the camera-side image stabilization control unit 133 starts an image stabilization control loop in which the camera body 100 is the slave. In this image stabilization control loop, the lens unit 150 functions as the master.

Note that the processing of step S105 and steps S113 to S117 that are included in the image stabilization control loop in which the camera body 100 is the slave is similar to the processing of step S105 and steps S114 to S117 that are included in the image stabilization control loop in which the camera body 100 is the master.

In step S120, the camera-side image stabilization control unit 133 receives data indicating the cutoff frequency from the lens unit 150, via the camera-side communication unit 140. In step S121, the camera-side image stabilization control unit 133 determines whether the data indicating the cutoff frequency received in step S120 is "−1" which is data (instruction information) instructing the camera-side to calculate the cutoff frequency itself. If the received data is "−1", the processing advances to step S122, and if that is not the case, the processing advances to step S123.

In step S122, the camera-side image stabilization control unit 133 calculates the cutoff frequency, based on the shake data acquired in step S105. That is, in the case where the data received in step S120 is "−1", control for aligning the cutoff frequencies on the camera side and the lens side is not performed.

In step S123, the camera-side image stabilization control unit 133 sets the cutoff frequency indicated in the data received in step S120 (case where the received data is not "−1") or the cutoff frequency calculated in step S122 in the camera-side HPF 162 and the camera-side LPF 163.

Step S124 is the end of the image stabilization control loop in which the camera body 100 is the slave. The processing within the image stabilization control loop of steps S119 to S124 is repeatedly executed every control cycle set in step S102. When the image stabilization control ends due to the end of shooting or the like, the processing breaks out of the image stabilization control loop and ends.

Figure 9A:
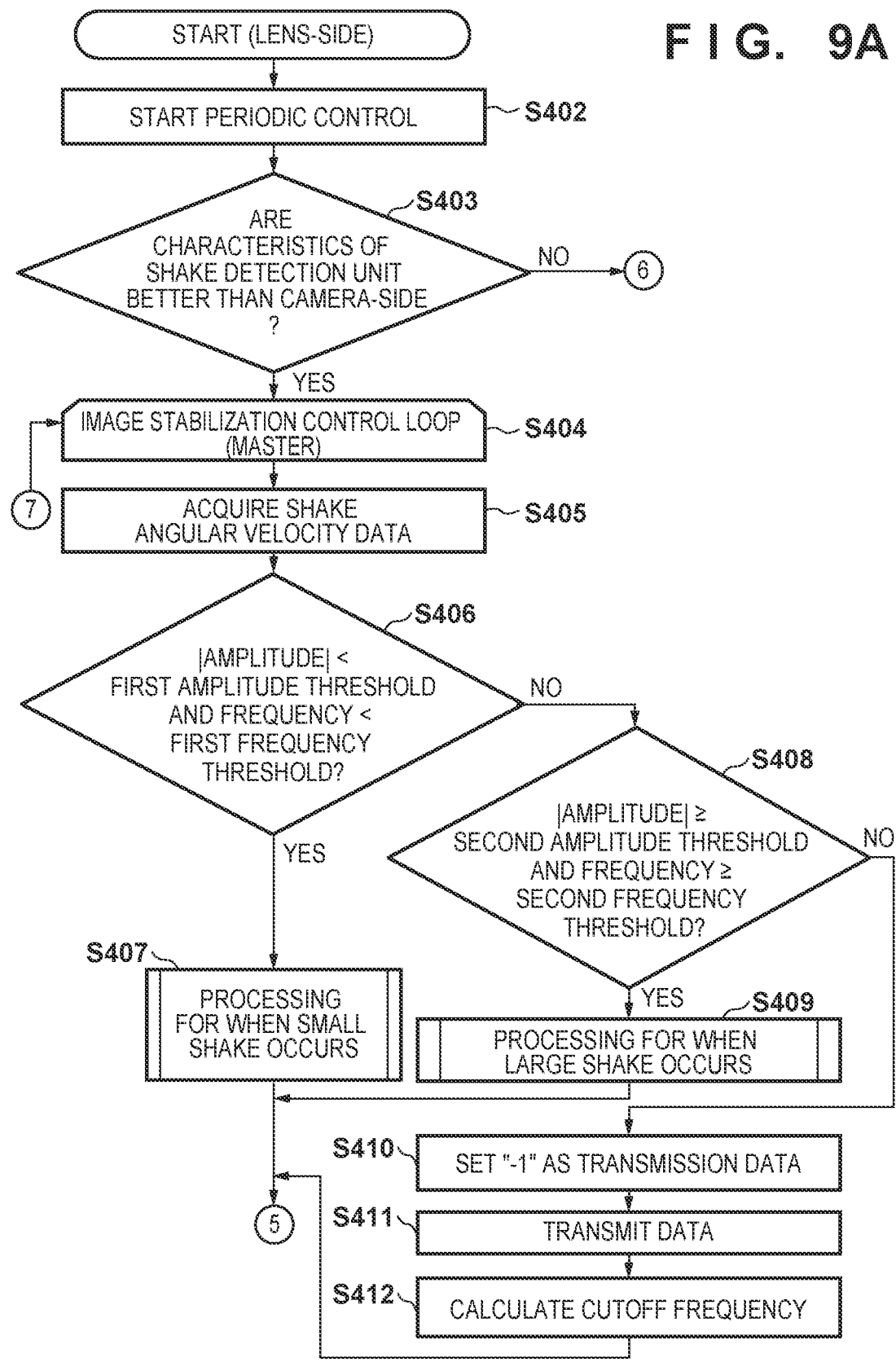
FIGS. 9A-9C are flowcharts of image blur correction processing by the lens unit 150.
Figure 9B:
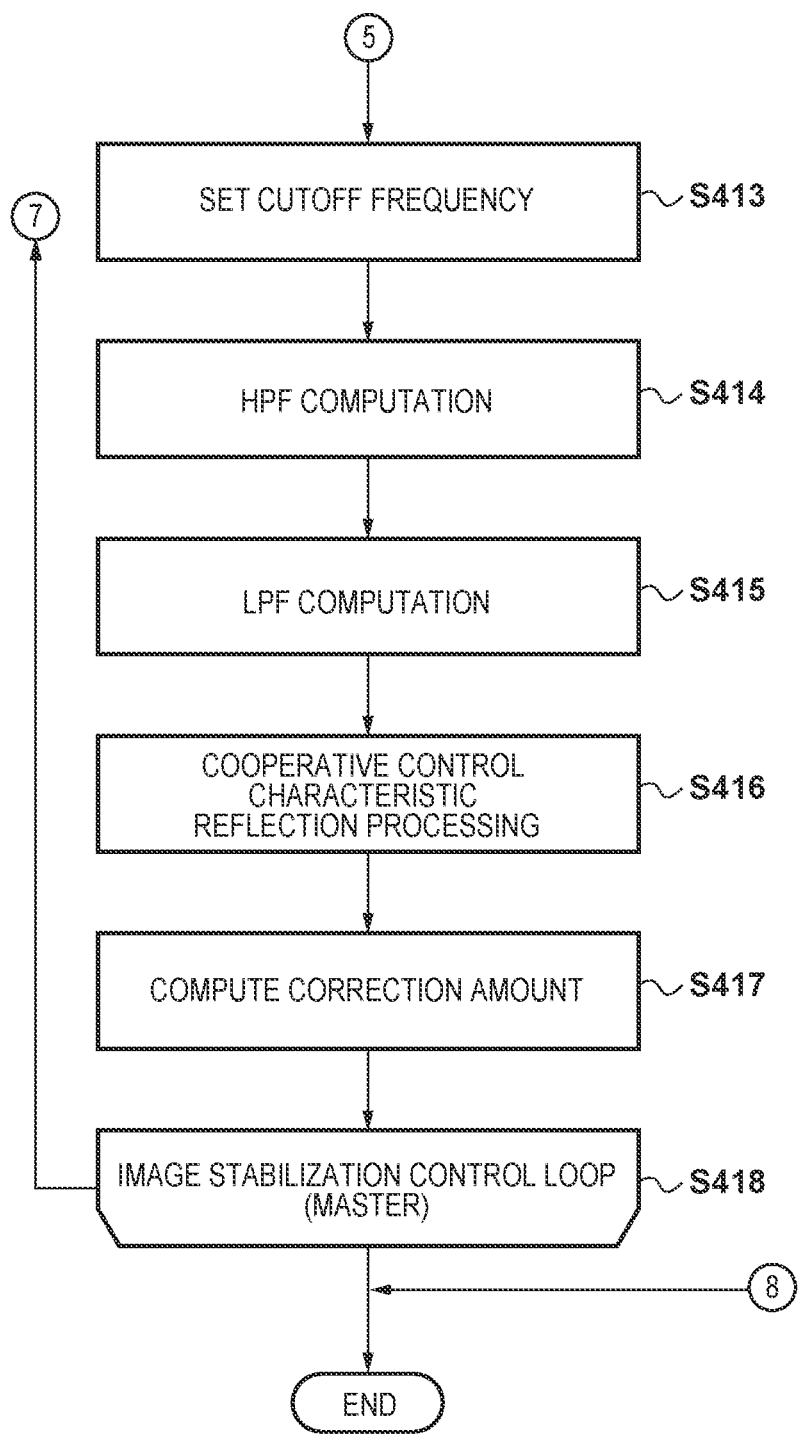
Figure 9C:
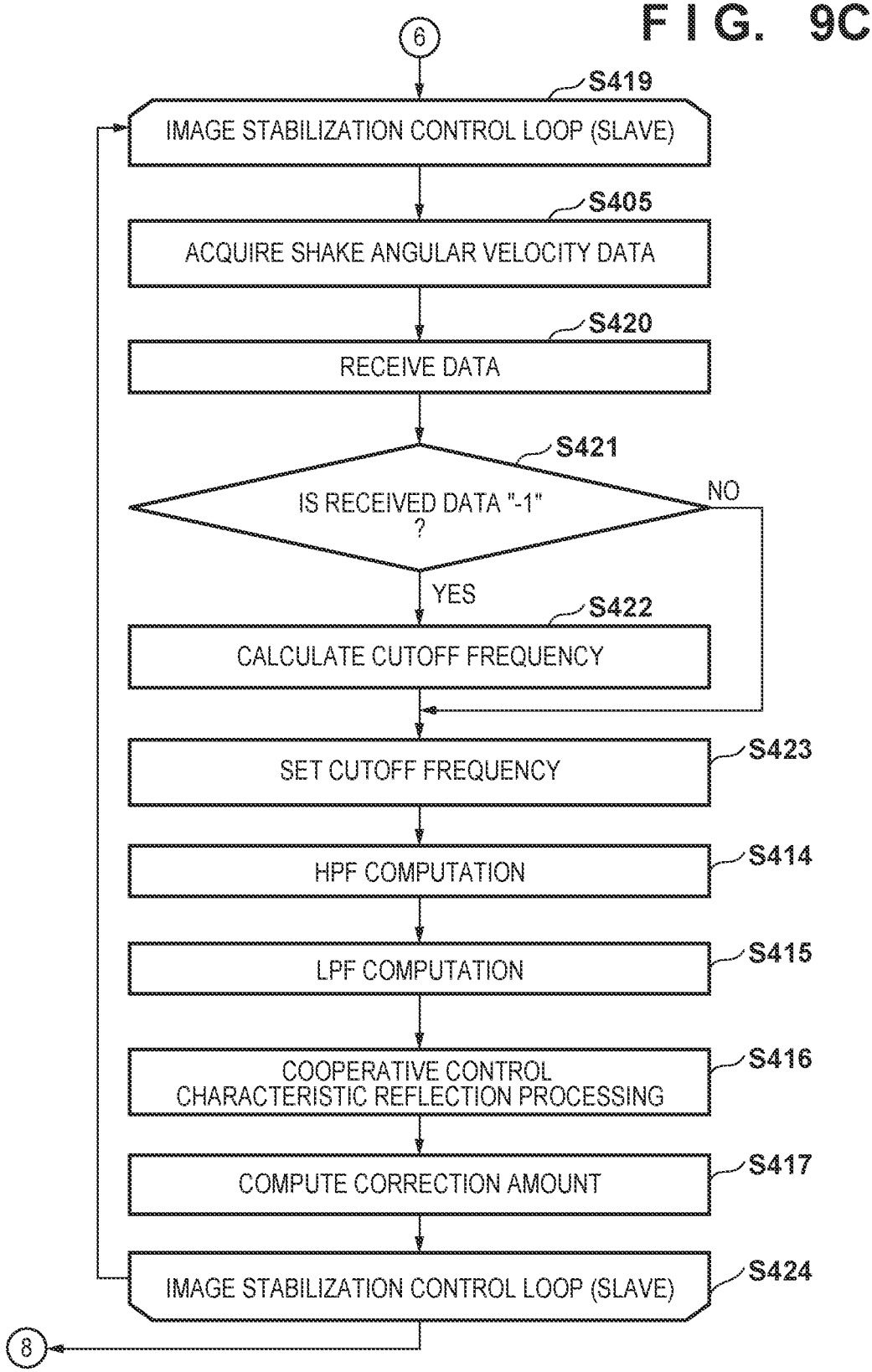

FIGS. 9A-9C are flowcharts of image blur correction processing by the lens unit 150. In step S402, the lens-side image stabilization control unit 126 starts periodic control. Here, the cycle of image stabilization control loop processing (steps S404 and S419) which will be described later is decided.

In step S403, the lens-side image stabilization control unit 126 determines whether the characteristics of the lens-side shake detection unit 125 are better than the characteristics of the camera-side shake detection unit 131. The characteristics being better means that the noise level is lower and the temperature drift component is smaller. If the characteristics are better, the processing advances to step S404, and if that is not the case, the processing advances to step S419. In the case of the former, the lens unit 150 acts as the master in relation to deciding the cutoff frequency, and, in the case of the latter, the lens unit 150 acts as the slave in relation to deciding the cutoff frequency.

In step S404, the lens-side image stabilization control unit 126 starts an image stabilization control loop in which the lens unit 150 is the master. On the other hand, in step S419, the lens-side image stabilization control unit 126 starts an image stabilization control loop in which the lens unit 150 is the slave.

Initially, the image stabilization control loop in which the lens unit 150 is the master will be described. In step S405, the lens-side image stabilization control unit 126 acquires shake angular velocity data acquired by the lens-side shake detection unit 125.

The processing of steps S406 to S415 is similar to the processing of steps S106 to S115 in FIGS. 6A and 6B. Rereading is carried out, however, in which portions that refer to the constituent elements of the camera body 100 and portions that refer to the constituent elements of the lens unit 150 in the description of FIGS. 6A and 6B are interchanged as appropriate. For example, the portions described as processing that is performed by the camera-side image stabilization control unit 133 is reread as processing that is performed by the lens-side image stabilization control unit 126. Similarly, the shake angular velocity data of the camera-side shake detection unit 131 is reread as shake angular velocity data of the lens-side shake detection unit 125.

In step S416, the lens-side cooperative control unit 129 reflects the cooperative control characteristics in the detected shake amount. This processing is similar to the processing in step S116 of FIG. 6B, but differs in terms of reflecting that the cooperative control characteristics based on the division ratio or frequency band on the lens side. Consider the case where the camera side handles 40% and the lens side handles 60%, for example, in the case of amplitude dividing the image blur correction amount between the camera side and the lens side. In this case, the lens-side cooperative control unit 129 multiplies the shake angle data after the processing of the HPF and the LPF calculated in step S415 by 60%. Also, consider the case where the camera side handles low frequencies less than 3 Hz and the lens side handles high frequencies greater than or equal to 3 Hz, for example, in the case of frequency dividing the image blur correction amount between the camera side and the lens side. In this case, the lens-side cooperative control unit 129 extracts the frequency band greater than or equal to 3 Hz with the HPF from the shake angle data after the processing of the HPF and the LPF calculated in step S415. In the case where the amplitude or frequency divided shake angle exceeds the correction range on the lens side, the lens-side cooperative control unit 129 clamps the shake angle in the correction range.

In step S417, the lens-side shake correction amount computing unit 154 calculates the final shake correction amount, by multiplying the shake angle in which the cooperative control characteristics are reflected by a gain relating to zoom magnification or subject distance.

Step S418 is the end of the image stabilization control loop in which the lens unit 150 is the master. The processing within the image stabilization control loop of steps S404 to S418 is repeatedly executed every control cycle set in step S402. When the image stabilization control ends due to the end of shooting or the like, the processing breaks out of the image stabilization control loop and ends.

The processing of the image stabilization control loop (steps S419 to S424) in which the lens unit 150 is the slave is similar to the image stabilization control loop (steps S119 to S124 in FIG. 6C) in which the camera body 100 is the slave. Rereading is carried out, however, in which portions that refer to the constituent elements of the camera body 100 and portions that refer to the constituent elements of the lens unit 150 in the description of FIG. 6C are interchanged as appropriate. For example, the portions described as processing that is performed by the camera-side image stabilization control unit 133 are reread as processing that is performed by the lens-side image stabilization control unit 126. Similarly, the shake angular velocity data of the camera-side shake detection unit 131 is reread as shake angular velocity data of the lens-side shake detection unit 125.

As described above, according to the first embodiment, an image stabilization control loop is executed with whichever of the image blur correction control apparatus of the camera body 100 and the image blur correction control apparatus of the lens unit 150 has the shake detection unit having the better characteristics as the master. The image stabilization control loop is executed with the other image blur correction control apparatus as the slave. In the case where a predetermined condition (shake is small, etc.) is satisfied, the image blur correction control apparatus serving as the master decides the cutoff frequency to be applied to filter processing based on the shake detected by the shake detection unit of the image blur correction control apparatus serving as the master, and transmits the decided cutoff frequency to the image blur correction control apparatus serving as the slave. In the two image blur correction control apparatuses serving as the master and the slave, it thereby becomes possible to use a cutoff frequency decided based on shake detected by the shake detection unit having the better characteristics.

Although description has been given taking an image capturing apparatus as an example, the present invention is not limited to only an image capturing apparatus, and can also be applied to a mobile device that has an image capturing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed calculating systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-117711, filed Jun. 25, 2019, which is hereby incorporated by reference herein in its entirety.

What is claimed is:

1. An image blur correction control apparatus for correcting image blur of an image capturing apparatus through sharing with a second image blur correction control apparatus in accordance with a predetermined sharing rule, comprising at least one processor and/or at least one circuit which functions as:

an acquiring unit configured to acquire shake information detected by a first detector configured to detect shake of the image capturing apparatus;

a determining unit configured to determine whether a first characteristic of the first detector is better than a second characteristic of a second detector included in the second image blur correction control apparatus;

a first deciding unit configured to, in a case where the first characteristic is better than the second characteristic, decide a first cutoff frequency based on the shake information detected by the first detector;

a transmitting unit configured to, in the case where the first characteristic is better than the second characteristic, transmit the first cutoff frequency to the second image blur correction control apparatus as a cutoff frequency to be used by the second image blur correction control apparatus;

a receiving unit configured to, in a case where the first characteristic is not better than the second characteristic, receive a second cutoff frequency from the second image blur correction control apparatus;

a filtering unit configured to perform filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and a second deciding unit configured to decide a correction amount based on the filter-processed shake information and the predetermined sharing rule.

2. The image blur correction control apparatus according to claim 1, wherein, in a case where shake indicated by the shake information does not satisfy a first criterion corresponding to small shake, the transmitting unit is configured to transmit, instead of the first cutoff frequency, first instruction information instructing the second image blur correction control apparatus to decide a cutoff frequency to be used by the second image blur correction control apparatus.

3. The image blur correction control apparatus according to claim 2, wherein, in a case where an absolute value of an amplitude of the shake indicated by the shake information is less than a first amplitude threshold, and a frequency of the shake indicated by the shake information is less than a first frequency threshold, the shake indicated by the shake information satisfies the first criterion.

4. The image blur correction control apparatus according to claim 2, wherein, in a case where the shake indicated by the shake information satisfies a second criterion corresponding to large shake, and the predetermined sharing rule is a sharing rule that the image blur correction control apparatus handles less than half of an amplitude of the shake of the image capturing apparatus, the transmitting unit is configured to transmit the first cutoff frequency, even in the case where the shake indicated by the shake information does not satisfy the first criterion.

5. The image blur correction control apparatus according to claim 2, wherein, in a case where the shake indicated by the shake information satisfies a second criterion corresponding to large shake, and the predetermined sharing rule is a sharing rule that the image blur correction control apparatus handles a high frequency component of the shake of the image capturing apparatus, the transmitting unit is configured to transmit the first cutoff frequency, even in the case where the shake indicated by the shake information does not satisfy the first criterion.

6. The image blur correction control apparatus according to claim 4, wherein, in a case where an absolute value of an amplitude of the shake indicated by the shake information is greater than or equal to a second amplitude threshold, and a frequency of the shake indicated by the shake information is greater than or equal to a second frequency threshold, the shake indicated by the shake information satisfies the second criterion.

7. The image blur correction control apparatus according to claim 1, wherein, in the case where the first characteristic is not better than the second characteristic, the receiving unit is configured to receive, from the second image blur correction control apparatus, the second cutoff frequency or second instruction information instructing the image blur correction control apparatus to decide a cutoff frequency to be used by the image blur correction control apparatus, in a case where the receiving unit receives the second instruction information, the first deciding unit is configured to decide the first cutoff frequency based on the shake information, and the filtering unit is configured to apply the first cutoff frequency in the filter processing.

8. A camera body comprising:

the image blur correction control apparatus according to claim 1;

an image sensor; and at least one processor and/or at least one circuit which functions as a correcting unit configured to drive the image sensor in a direction orthogonal to an optical axis, in accordance with the correction amount.

9. A camera body comprising:

the image blur correction control apparatus according to claim 1;

an image sensor; and at least one processor and/or at least one circuit which functions as a correcting unit configured to change a position acquired as an image in an image capturing signal generated by the image sensor, in accordance with the correction amount.

10. A lens unit comprising:

the image blur correction control apparatus according to claim 1;

a shooting optical system including a correction lens; and at least one processor and/or at least one circuit which functions as a correcting unit configured to drive the correction lens in a direction orthogonal to an optical axis, in accordance with the correction amount.

11. An image blur correction control method executed by an image blur correction control apparatus configured to correct image blur of an image capturing apparatus through sharing with a second image blur correction control apparatus in accordance with a predetermined sharing rule, comprising:

acquiring shake information detected by a first detector configured to detect shake of the image capturing apparatus;

determining whether a first characteristic of the first detector is better than a second characteristic of a second detector included in the second image blur correction control apparatus;

in a case where the first characteristic is better than the second characteristic, deciding a first cutoff frequency based on the shake information detected by the first detector;

in the case where the first characteristic is better than the second characteristic, transmitting the first cutoff frequency to the second image blur correction control apparatus as a cutoff frequency to be used by the second image blur correction control apparatus;

in a case where the first characteristic is not better than the second characteristic, receiving a second cutoff frequency from the second image blur correction control apparatus;

performing filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and deciding a correction amount based on the filter-processed shake information and the predetermined sharing rule.

12. A non-transitory computer-readable storage medium which stores a program for causing a computer of an image blur correction control apparatus to execute an image blur correction control method for correcting image blur of an image capturing apparatus through sharing with a second image blur correction control apparatus in accordance with a predetermined sharing rule, the method comprising:

acquiring shake information detected by a first detector configured to detect shake of the image capturing apparatus;

determining whether a first characteristic of the first detector is better than a second characteristic of a second detector included in the second image blur correction control apparatus;

in a case where the first characteristic is better than the second characteristic, deciding a first cutoff frequency based on the shake information detected by the first detector;

in the case where the first characteristic is better than the second characteristic, transmitting the first cutoff frequency to the second image blur correction control apparatus as a cutoff frequency to be used by the second image blur correction control apparatus;

in a case where the first characteristic is not better than the second characteristic, receiving a second cutoff frequency from the second image blur correction control apparatus;

performing filter processing on the shake information detected by the first detector, the first cutoff frequency being applied in the filter processing in the case where the first characteristic is better than the second characteristic, and the second cutoff frequency being applied in the filter processing in the case where the first characteristic is not better than the second characteristic; and deciding a correction amount based on the filter-processed shake information and the predetermined sharing rule.

* * * * *